(12) United States Patent
Naganawa et al.

(10) Patent No.: US 12,466,170 B2
(45) Date of Patent: Nov. 11, 2025

(54) GAS BARRIER LAMINATE

(71) Applicant: LINTEC CORPORATION, Tokyo (JP)

(72) Inventors: Satoshi Naganawa, Tokyo (JP); Takumi Furuya, McKinney, TX (US)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 18/709,622

(22) PCT Filed: Mar. 8, 2023

(86) PCT No.: PCT/JP2023/008770
§ 371 (c)(1),
(2) Date: May 13, 2024

(87) PCT Pub. No.: WO2023/189318
PCT Pub. Date: Oct. 5, 2023

(65) Prior Publication Data
US 2024/0424777 A1    Dec. 26, 2024

(30) Foreign Application Priority Data
Mar. 29, 2022   (JP) ................. 2022-053952

(51) Int. Cl.
C09J 7/38 (2018.01)
B32B 27/38 (2006.01)

(52) U.S. Cl.
CPC .............. B32B 27/38 (2013.01); C09J 7/38 (2018.01); *B32B 2307/414* (2013.01); *B32B 2307/51* (2013.01); *B32B 2307/7246* (2013.01); *B32B 2307/7376* (2023.05); *Y10T 428/2809* (2015.01); *Y10T 428/2848* (2015.01); *Y10T 428/2852* (2015.01); *Y10T 428/287* (2015.01)

(58) Field of Classification Search
None
See application file for complete search history.

(56) References Cited

U.S. PATENT DOCUMENTS

2004/0213973 A1    10/2004   Hara et al.
2009/0195152 A1*   8/2009    Sawano .............. H10K 59/38
                                                            313/506
2011/0086220 A1*   4/2011    Yoshida .............. B32B 27/34
                                                            428/317.5
2015/0367602 A1*   12/2015   Iwaya ................. C09J 133/14
                                                            428/522
2016/0075871 A1    3/2016    Morita et al.
2019/0218430 A1    7/2019    Nishijima et al.

FOREIGN PATENT DOCUMENTS

| JP | H10242606 A | 9/1998 |
| JP | 2004327623 A | 11/2004 |
| JP | 2005181548 A | 7/2005 |
| JP | 2007261211 A | 10/2007 |
| JP | 2013006893 A | 1/2013 |
| JP | 2013064078 A | 4/2013 |
| JP | 2013173834 A | 9/2013 |
| JP | 2015153942 A | 8/2015 |
| JP | 2019171792 A | 10/2019 |
| JP | 6626998 B2 | 12/2019 |
| JP | 7447179 B2 | 3/2024 |
| WO | WO-2014126115 A1 | 8/2014 |
| WO | WO-2014171404 A1 | 10/2014 |
| WO | WO-2015076236 A1 | 5/2015 |
| WO | WO-2018047919 A1 | 3/2018 |

OTHER PUBLICATIONS

Decision to Grant issued Feb. 6, 2024 in corresponding Japanese Patent Application No. 2022-053952 (with English translation), 6 pages.
International Search Report issued May 9, 2023 in PCT/JP2023/008770 (with English translation), 5 pages.
Japanese Office Action issued Oct. 17, 2023 on JP2022-053952.

* cited by examiner

*Primary Examiner* — Anish P Desai
(74) *Attorney, Agent, or Firm* — Element IP, PLC

(57) ABSTRACT

There is provided a gas barrier laminate capable of providing a singulated product in which occurrence of breakage of a gas barrier layer is suppressed when the gas barrier laminate is laminated on an adherend and singulated together with the adherend, the gas barrier laminate including a base material, the gas barrier layer, and a hardenable pressure sensitive adhesion agent layer in this order, wherein the hardenable pressure sensitive adhesion agent layer has a post-curing storage modulus E1 at 23° C. of 1.0 GPa or more.

11 Claims, 7 Drawing Sheets

GAS BARRIER LAMINATE

TECHNICAL FIELD

The present invention relates to a gas barrier laminate.

BACKGROUND ART

It has been proposed to attach a gas barrier laminate having a pressure sensitive adhesive layer and a gas barrier layer to an adherend such as a plastic base material for use in various electronic devices compatible with optical applications, including display devices such as a liquid crystal display and an organic electroluminescence (EL) display.

For example, Patent Document 1 proposes that a gas barrier pressure sensitive adhesion sheet having a pressure sensitive adhesive layer, a gas barrier layer, and a protective layer in this order is laminated on an adherend via the pressure sensitive adhesive layer.

On the other hand, also in a case of producing a sensor device or the like in which an optical sensor or the like is formed on a silicon wafer using a semi-conductor process or the like, high sealing properties are required in some cases. In the production of such a sensor device, singulation is performed through a dicing process at the final stage. In general, each sensor is sealed with a molding agent. However, for example, in a case of a sensor of a type requiring transparency in a sealing agent, such as an optical sensor, or a sensor in which a sensing region is sensitive to moisture, sufficient sealing properties may not be obtained by sealing with the molding agent. For this reason, it has been desired to enhance the sealing properties by a method different from proposed known sealing methods.

The gas barrier pressure sensitive adhesion sheet described in Patent Document 1 aims to improve bending resistance while avoiding an increase in thickness, and a storage modulus at 23° C. of the pressure sensitive adhesive layer is set to a low value of MPa or less. Patent Document 1 does not consider use of the gas barrier pressure sensitive adhesive sheet in applications including the dicing process described above.

CITATION LIST

Patent Literature

Patent Document 1: JP 6626998 B

SUMMARY OF INVENTION

Technical Problem

In view of the above, an object of the present invention is to provide a gas barrier laminate that can be laminated on an adherend and singulated together with the adherend, whereby breakage of a gas barrier layer is suppressed.

Solution to Problem

As a result of intensive studies to solve the above problems, the present inventors have found that the above problems can be solved by providing a gas barrier laminate including a base material, a gas barrier layer, and a hardenable pressure sensitive adhesion agent layer in this order, wherein a storage modulus of the hardenable pressure sensitive adhesion agent layer is set to a predetermined value, and have completed the present invention.

That is, the present invention provides the following [1] to [7].

[1] A gas barrier laminate including a base material, a gas barrier layer, and a hardenable pressure sensitive adhesion agent layer in this order,
wherein the hardenable pressure sensitive adhesion agent layer has a post-curing storage modulus E1 at 23° C. of 1.0 GPa or more.

[2] The gas barrier laminate according to [1], wherein the hardenable pressure sensitive adhesion agent layer has a storage modulus E0 at 23° C. of from 0.01 to 10 MPa.

[3] The gas barrier laminate according to [1] or [2], wherein the hardenable pressure sensitive adhesion agent layer has a thickness of 1 μm or more.

[4] The gas barrier laminate according to any one of [1] to [3], wherein the gas barrier layer has a water vapor transmission rate of $1.0 \times 10^{-2}$ g/m$^2$/day or less in an atmosphere of 40° C. and 90% relative humidity.

[5] The gas barrier laminate according to any one of [1] to [4], wherein the gas barrier layer includes a modified layer formed by ion implantation and/or a chemical vapor deposition layer.

[6] The gas barrier laminate according to any one of [1] to [5], wherein the gas barrier laminate has a light transmittance of 85% or more at at least any of wavelengths in a range of from 380 to 780 nm.

[7] A method for producing a sealed body, including:
attaching the hardenable pressure sensitive adhesion agent layer of the gas barrier laminate described in any one of [1] to [6] to a surface of a workpiece to seal the surface of the workpiece; and
cutting the workpiece whose surface has been sealed by the gas barrier laminate to obtain a singulated sealed body.

Advantageous Effects of Invention

The present invention can provide a gas barrier laminate that can provide a singulated product in which occurrence of breakage of a gas barrier layer is suppressed when the gas barrier laminate is laminated on an adherend and singulated together with the adherend.

DESCRIPTION OF EMBODIMENTS

Figure 1:
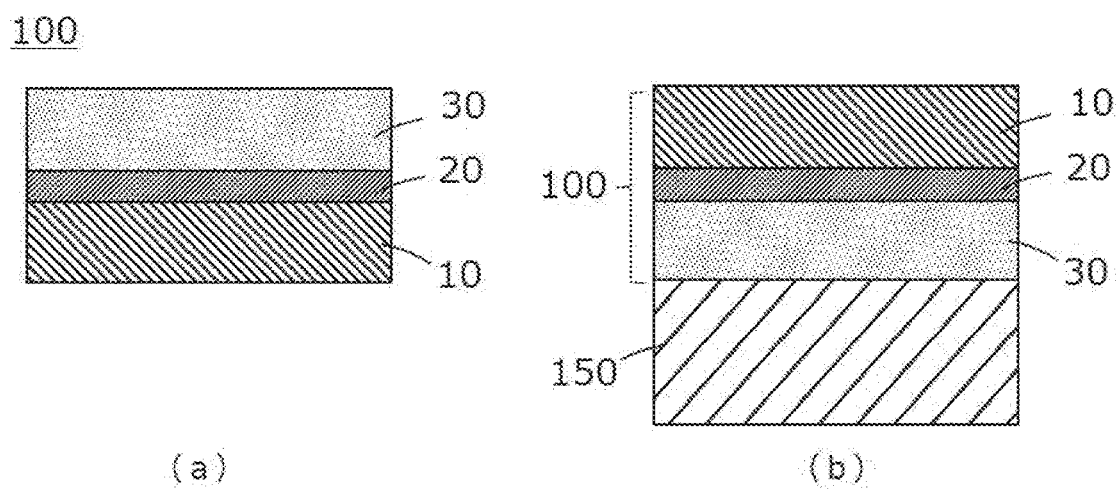
FIG. 1 includes cross-sectional views each illustrating an example of a gas barrier laminate of the present invention.

In the present specification, the preferred provisions can be selected as desired, and combinations of the preferred provisions are more preferable.

In the present specification, the description "from XX to YY" means "XX or higher and YY or lower" or "XX or greater and YY or less".

In the present specification, the lower and upper limits of a preferable numerical range (for example, a range of content) described in series can each be independently combined. For example, from the description "preferably from 10 to 90, more preferably from 30 to 60", the "preferred lower limit (10)" and the "preferred upper limit (60)" can be combined as "from 10 to 60".

In the present specification, for example, "(meth)acrylic acid" refers to both "acrylic acid" and "methacrylic acid", and the same is true of other similar terms.

For easy understanding, the present invention will be described with reference to the drawings, but is not limited to what is illustrated in the drawings.

Gas Barrier Laminate

A gas barrier laminate according to an embodiment of the present invention includes a base material, a gas barrier layer, and a hardenable pressure sensitive adhesion agent layer in this order, and the hardenable pressure sensitive adhesion agent layer has a post-curing storage modulus $E1$ at 23° C. of 1.0 GPa or more.

When the hardenable pressure sensitive adhesion agent layer has a post-curing storage modulus $E1$ at 23° C. of 1.0 GPa or more, rigidity of the entire gas barrier laminate is enhanced. Therefore, it is presumed that, when the gas barrier laminate is attached to a workpiece, the hardenable pressure sensitive adhesion agent layer is cured, and then the workpiece is cut together with the gas barrier laminate for singulation, deformation at a cut end portion is suppressed, and that the workpiece can be singulated while breakage of the gas barrier layer is avoided.

In the present specification, the term "post-curing" included in the definition of the storage modulus $E1$ refers to a state in which, due to a curing treatment, a quantity of increase in gel fraction is only 10 points or less even when a further curing treatment is performed. Examples of the curing treatment include a case where the hardenable pressure sensitive adhesion agent layer is thermally cured at 150° C. for 1 hour.

FIG. 1 includes schematic cross-sectional views each illustrating an example of a gas barrier laminate of the present invention.

In a gas barrier laminate 100 illustrated in FIG. 1(a), a base material 10, a gas barrier layer 20, and a hardenable pressure sensitive adhesion agent layer 30 are disposed in this order.

As illustrated in FIG. 1(b), the gas barrier laminate 100 can impart gas barrier properties to an adherend 150 by attaching the hardenable pressure sensitive adhesion agent layer 30 to the adherend 150.

The base material 10 serves to protect the gas barrier layer 20 from contact with an external member or the like before and after the gas barrier laminate 100 is attached to the adherend 150.

The hardenable pressure sensitive adhesion agent layer 30 has a post-curing storage modulus $E1$ at 23° C. of 1.0 GPa or more. Therefore, when the gas barrier laminate is laminated on the adherend and singulated together with the adherend, a singulated product in which occurrence of breakage of the gas barrier layer is suppressed can be obtained.

A release sheet or protective film may be provided on a back surface of the hardenable pressure sensitive adhesion agent layer 30 (a surface opposite to the gas barrier layer 20), or a release sheet or protective film may be provided on a front surface of the base material 10 (a surface on the opposite side to the gas barrier layer 20). The release sheet or protective film serves to protect the hardenable pressure sensitive adhesion agent layer and the base material at the time of storage and conveyance of the gas barrier laminate. The release sheet or protective film provided on the back surface of the hardenable pressure sensitive adhesion agent layer 30 is peeled off and removed before the gas barrier laminate is attached to the adherend, and the release sheet or protective film provided on the front surface of the base material 10 is peeled off and removed at any time point from before to after the gas barrier laminate is attached to the adherend.

The post-curing storage modulus $E1$ at 23° C. (hereinafter, also simply referred to as "storage modulus $E1$") of the hardenable pressure sensitive adhesion agent layer is obtained as a value at 23° C. when a plurality of hardenable pressure sensitive adhesion agent layers made of the same material are layered until the required thickness for measurement is reached, and after curing, measured using a storage modulus measuring apparatus under the conditions of a frequency of 11 Hz, an amplitude of 5 μm, and a temperature increase rate of 3° C./min. The storage modulus $E1$ is specifically measured by a method which will be described in the Examples.

The storage modulus $E1$ is preferably 1.1 GPa or more, more preferably 2.0 GPa or more, still more preferably 3.0 GPa or more, yet still more preferably 4.0 GPa or more, and particularly preferably 5.0 GPa or more from the perspective of more easily suppressing end portion deformation of the singulated product. The upper limit of the storage modulus $E1$ is not particularly limited, and is, for example, 10.0 GPa or less from the perspective of ease of production. In other words, the storage modulus $E1$ is preferably from 1.0 to 10.0 GPa.

In order to set the storage modulus $E1$ of the hardenable pressure sensitive adhesion agent layer to 1.0 GPa or more, a method can be used, for example, in which the hardenable pressure sensitive adhesion agent layer is formed using a hardenable pressure sensitive adhesion agent material including a curable resin material as will be described later.

The gas barrier laminate preferably has a light transmittance of 85% or more at at least any of wavelengths in a range of from 380 to 780 nm. When the light transmittance is in the above range, the gas barrier laminate has high light transmittance. Therefore, the gas barrier laminate, when applied to a device such as a sensor, is unlikely to deteriorate an optical performance of the sensor.

The light transmittance is measured in accordance with JIS K 7361-1:1997.

A thickness of the gas barrier laminate can be determined as appropriate according to the type and application of an electronic device or the like before singulation as the adherend. The thickness of the gas barrier laminate is preferably from 5 to 300 μm, more preferably from 20 to 200 μm, and still more preferably from 50 to 100 μm, from the perspective of handling.

Application of Gas Barrier Laminate

As will be described below, the gas barrier laminate is attached to an adherend, then singulated together with the adherend, and thus functions as a sealing layer for sealing a singulated product. Hereinafter, application of the gas barrier laminate will be specifically described with reference to the drawings.

Figure 2:
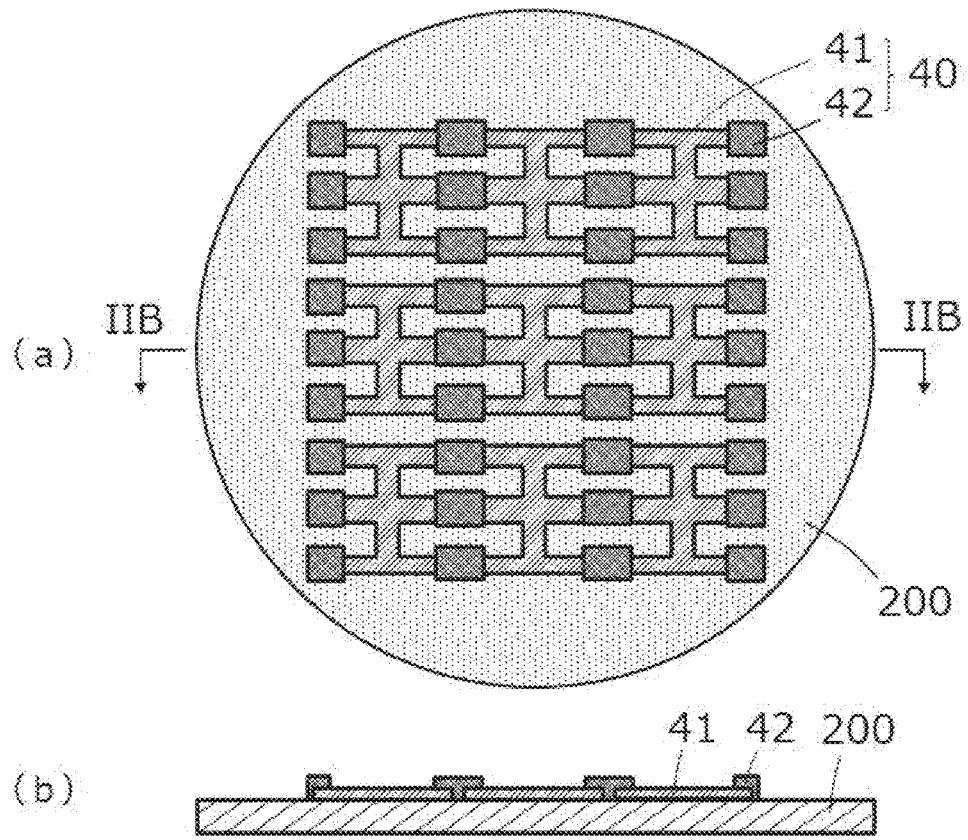
FIG. 2 includes schematic views each illustrating an example of an electric-wiring-attached wafer.

FIG. 2 includes schematic views each illustrating an example of the adherend, specifically, a schematic view illustrating an example of an electric-wiring-attached wafer as the adherend.

FIG. 2(a) is a plan view of a surface on which the electric wiring is formed, and FIG. 2(b) is a cross-sectional view taken along a line IIB-IIB in FIG. 2(a).

In an electric-wiring-attached wafer 201 illustrated in FIG. 2, a functional element, such as a sensor, including electric wiring 40 such as wiring 41 and an electrode 42 is formed on a semiconductor wafer 200 by a semiconductor process or a method such as printing, plating, or vapor deposition. Hereinafter, the electric wiring 40 includes also a functional element such as a sensor.

The electric-wiring-attached wafer 201 is an adherend to which the gas barrier laminate is attached, and is also a workpiece to which a dicing step as will be described later is applied.

In the present specification, for easy recognition of shapes of and a positional relationship among components, hatching or coloring is applied even in the plan view in accordance with the cross-sectional view.

Figure 3:
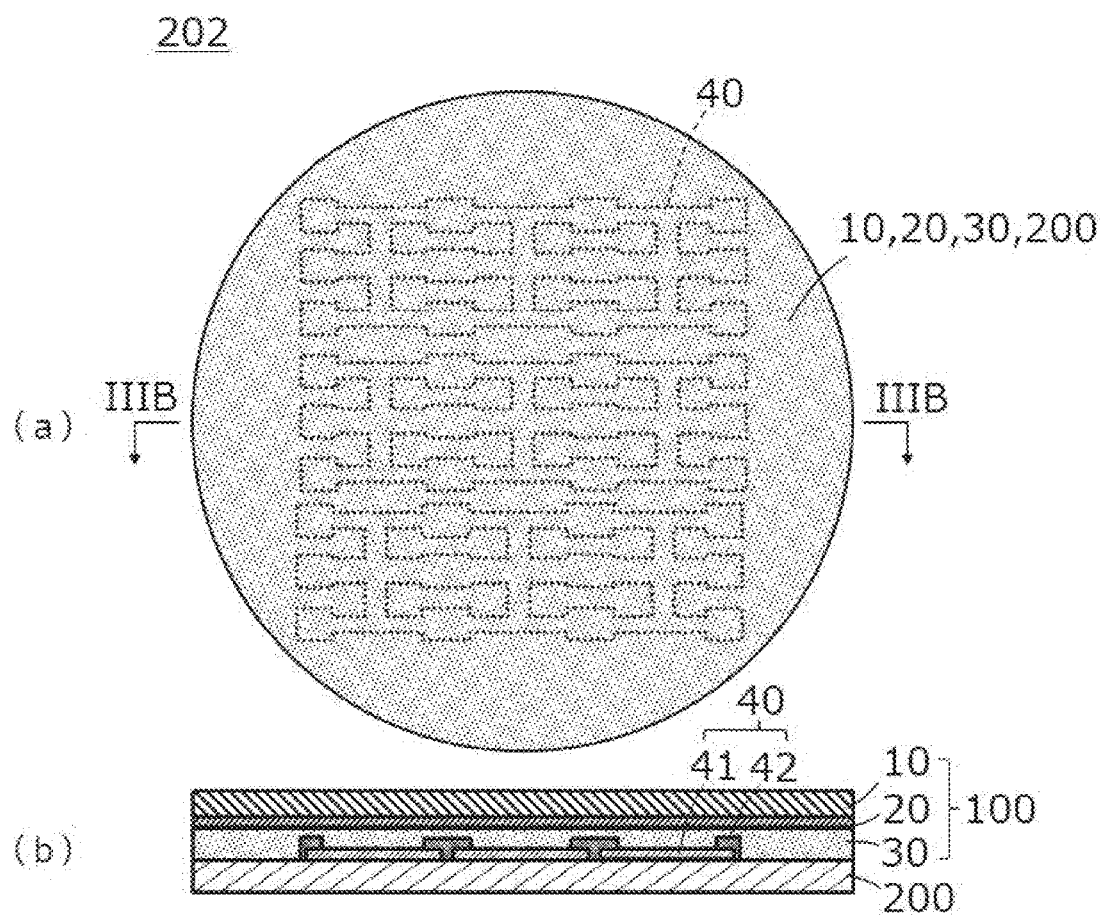
FIG. 3 includes schematic views each illustrating an example of a gas-barrier-laminate-attached wafer.

FIG. 3 includes schematic views each illustrating an example of a gas-barrier-laminate-attached wafer as a gas-barrier-laminate-attached adherend.

A gas-barrier-laminate-attached wafer 202 illustrated in FIG. 3 is a composite in which the gas barrier laminate 100 having the hardenable pressure sensitive adhesion agent layer 30, the gas barrier layer 20, and the base material 10 in this order is laminated on an electric wiring formation surface of the electric-wiring-attached wafer 201 illustrated in FIG. 2 so that the hardenable pressure sensitive adhesion agent layer 30 and the electric wiring formation surface face each other.

FIG. 3(a) is a plan view of the surface on which the gas barrier laminate 100 is laminated, and the electric wiring 40 is indicated by a broken line (that is, in a see-through state). FIG. 3(b) is a cross-sectional view taken along a line IIIB-IIIB in FIG. 3(a).

When the gas barrier laminate is disposed on the adherend, the gas barrier laminate can be sequentially pressed against the adherend by using a laminator or the like to be attached.

Figure 4:
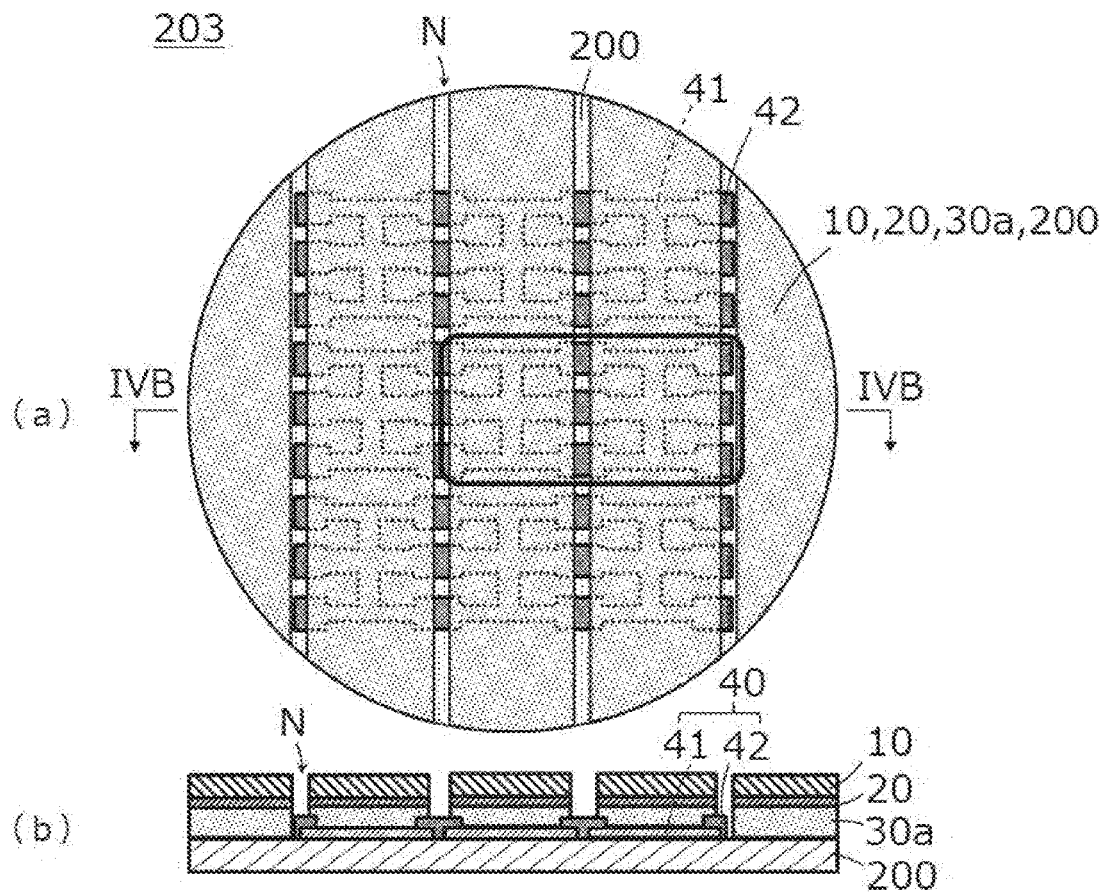
FIG. 4 includes schematic views each illustrating an example of a gas-barrier-laminate-attached wafer after electrode exposure.

After the gas barrier laminate is attached to the adherend, a curing treatment is performed to cure the hardenable pressure sensitive adhesion agent layer 30, thereby forming a cured hardenable pressure sensitive adhesion agent layer (in each of FIG. 4 and the subsequent figures, the cured hardenable pressure sensitive adhesion agent layer is denoted by reference numeral 30a). Thus, the post-curing storage modulus E1 at 23° C. of the cured hardenable pressure sensitive adhesion agent layer 30a can be 1.0 GPa or more.

When a material containing a thermosetting resin component is used as a curable resin material forming the hardenable pressure sensitive adhesion agent layer, the curing treatment can be performed by heating the material for a predetermined time to cure the hardenable pressure sensitive adhesion agent layer.

FIG. 4 includes schematic views each illustrating an example of a wafer after the gas barrier laminate is attached thereto, the hardenable pressure sensitive adhesion agent layer is subjected to the curing treatment, and electrode exposure is performed (hereinafter referred to as "gas-barrier-laminate-attached wafer after electrode exposure").

A gas-barrier-laminate-attached wafer 203 after electrode exposure illustrated in FIG. 4 is obtained by peeling off and removing a part of the gas barrier laminate 100 from the gas-barrier-laminate-attached wafer 202 illustrated in FIG. 3 to expose a portion of the electrode 42 to serve as a lead-out electrode (i.e., electrode exposure is performed).

FIG. 4(a) is a plan view of the gas-barrier-laminate-attached wafer 203 after electrode exposure, and the electric wiring 40 is indicated by a broken line. FIG. 4(b) is a cross-sectional view taken along a line IVB-IVB of FIG. 4(a).

As illustrated in FIGS. 4(a) and 4(b), the cured hardenable pressure sensitive adhesion agent layer 30a, the gas barrier layer 20, and the base material 10 derived from the gas barrier laminate 100 are each removed at a position corresponding to at least a part of the electrode 42 to form linear a notch N. Accordingly, the electrode 42 and a part of the wafer 200 are exposed to the outside through the notch N (that is, the electrode is exposed).

Partial removal of the gas barrier laminate 100 can be performed by, for example, laser processing or mechanical partial peeling using a cutter. The gas barrier laminate 100 may be disposed only at a necessary portion of the electric-wiring-attached wafer 201 as the adherend to form a portion where the gas barrier laminate 100 is absent, which corresponds to the notch N. In addition, after formation of the notch N, the hardenable pressure sensitive adhesion agent layer 30 may be subjected to the curing treatment.

Figure 5:
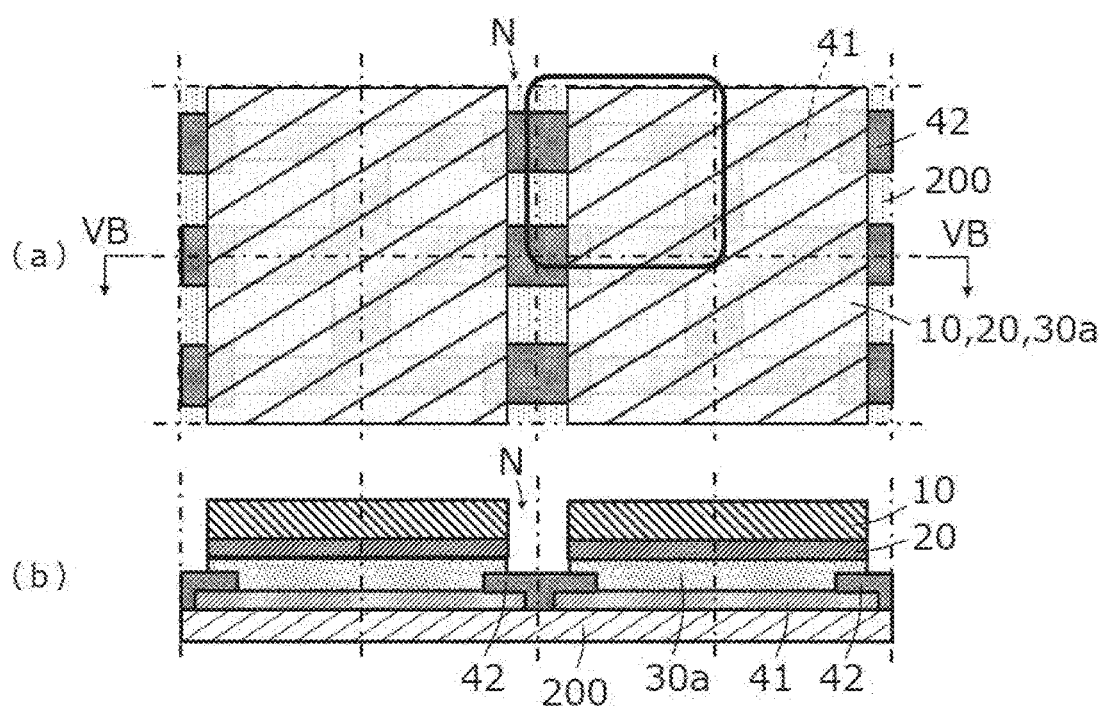
FIG. 5 includes partially enlarged views of the gas-barrier-laminate-attached wafer after electrode exposure.

FIG. 5 includes partially enlarged views of the gas-barrier-laminate-attached wafer after electrode exposure.

More specifically, FIG. 5(a) is an enlarged view of a site surrounded by a thick line in FIG. 4(a), and FIG. 5(b) is a cross-sectional view corresponding thereto (i.e., taken along a line VB-VB in FIG. 5(a)).

The laminate-attached wafer 203 after electrode exposure is cut, along dicing lines indicated by alternate long and short dash lines in FIG. 5, into pieces so that each piece includes a sensor part (that is, the electric-wiring-attached wafer 201 is cut together with each layer derived from the gas barrier laminate 100) to obtain singulated chips as singulated products.

In FIG. 5(a), regions corresponding to the cured hardenable pressure sensitive adhesion agent layer 30a, the gas barrier layer 20, and the base material 10 derived from the gas barrier laminate 100 are illustrated in a see-through state.

Figure 6:
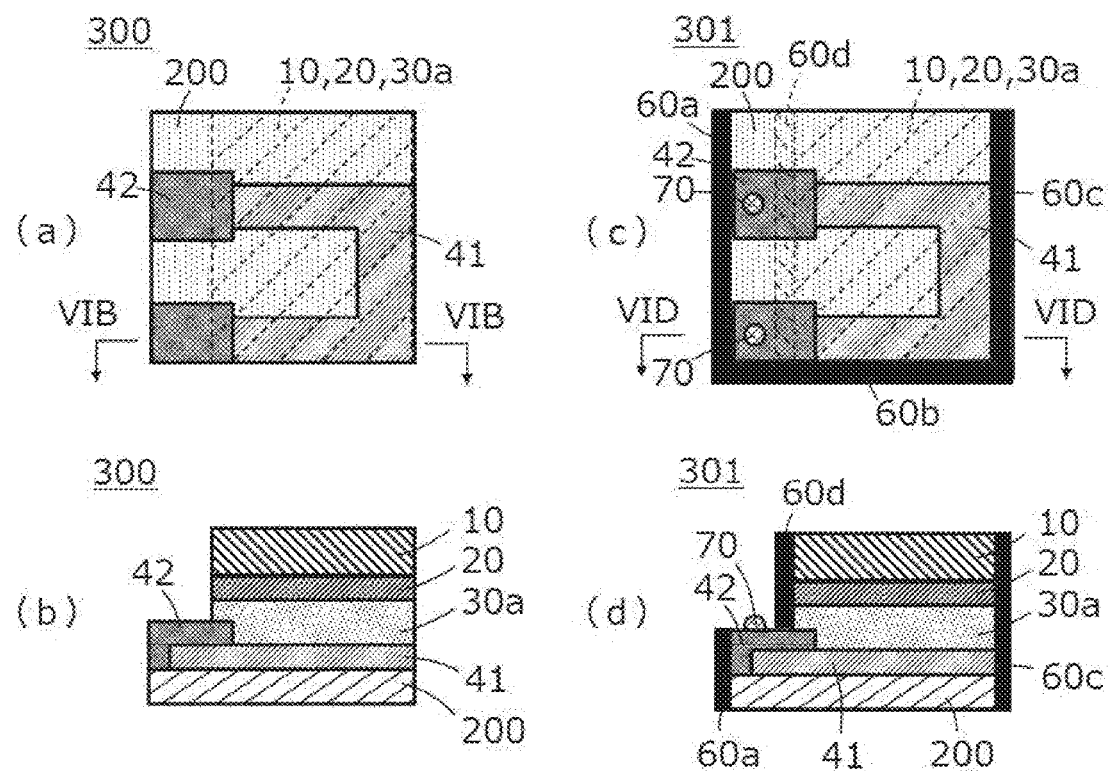
FIG. 6 includes schematic views of singulated chips.

FIG. 6 includes schematic views of singulated chips obtained through a dicing step.

FIG. 6(a) is a plan view of a singulated chip 300 corresponding to a site surrounded by a thick line in FIG. 5(a), and FIG. 6(b) is a cross-sectional view corresponding thereto (i.e., taken along a line VIB-VIB in FIG. 6(a)).

In FIG. 6(a), regions corresponding to the base material 10, the gas barrier layer 20, and the cured hardenable pressure sensitive adhesion agent layer 30a derived from the gas barrier laminate 100 are indicated by broken lines.

As illustrated in FIGS. 6(a) and 6(b), at least an electric wiring formation surface of the singulated chip 300 is sealed with the layers derived from the gas barrier laminate 100.

In the singulated chip 300, terminals (terminals 70 which will be described later) for use in electrical connection to external wiring or the like are formed on the electrode 42. In addition, side surface sealing layers (side surface sealing layers 60a to 60d which will be described later) are formed on side surfaces where the wiring 41, the electrode 42, and the gas barrier layer 20 are exposed.

FIG. 6(c) is a plan view of a singulated chip 301 after formation of the side surface sealing layers 60a to 60d, and is a plan view corresponding to FIG. 6(a). FIG. 6(d) is a cross-sectional view of the singulated chip 301 after formation of the side surface sealing layers 60a to 60d, and is a cross-sectional view corresponding to FIG. 6(b) (that is, taken along a line VID-VID in FIG. 6(c)).

The side surface sealing layers 60a to 60d mainly cover and seal the side surfaces (cross sections) of the wiring 41 and the electrode 42 exposed by dicing among the cross-sections formed by dicing, and suppress entry of moisture or the like.

The side surface sealing layers can be formed of a material such as a metal or a metal oxide by a technique such as vacuum deposition or plating.

Figure 7:
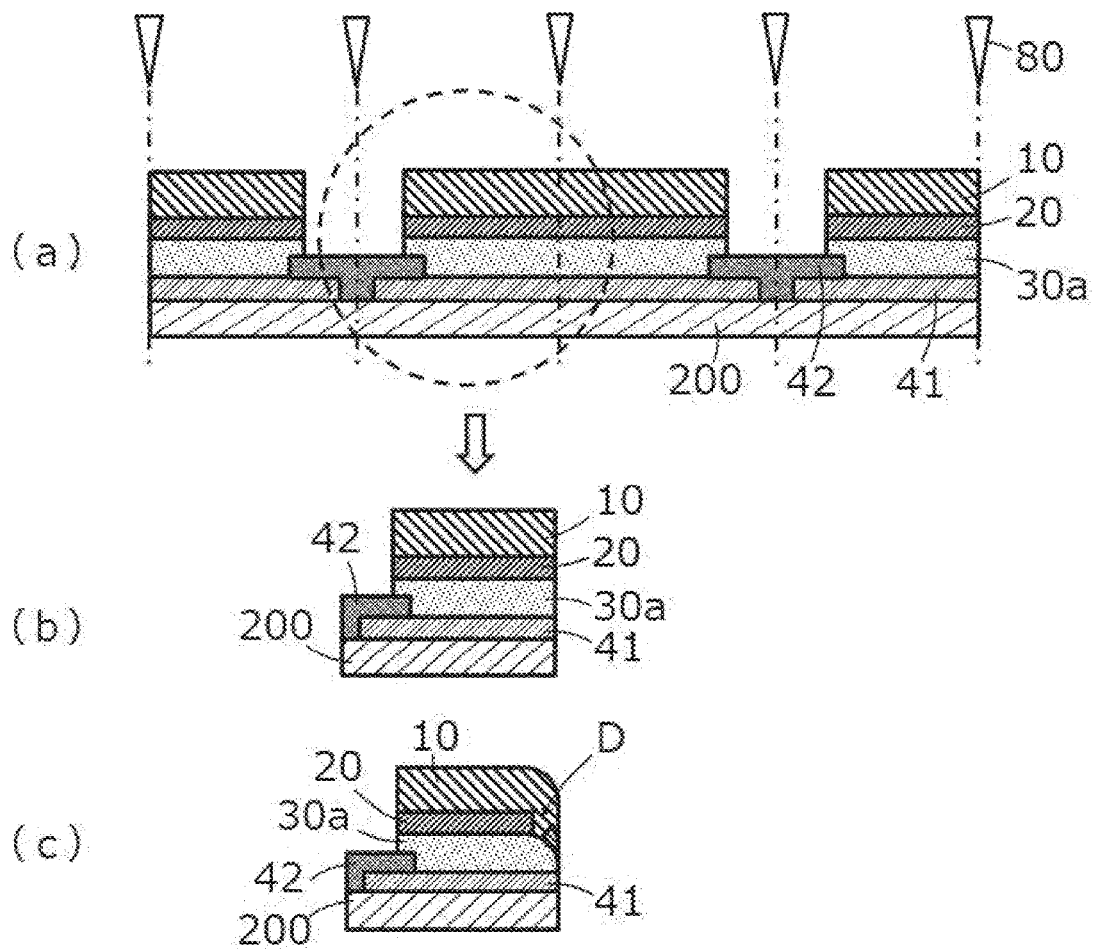
FIG. 7 includes explanatory views of a problem.

FIG. 7 includes explanatory views of a problem in the dicing step.

FIG. 7(a) is a view illustrating a state in which the laminate-attached wafer 203 is cut along dicing lines by a dicer 80.

FIG. 7(b) is a cross-sectional view illustrating a singulated chip having a normal structure obtained by dicing.

FIG. 7(c) is a cross-sectional view illustrating a singulated chip having an abnormal structure obtained by dicing.

The studies by the present inventors have revealed a problem that the gas barrier properties deteriorate when the laminate-attached wafer 203, after electrode exposure, is cut along the dicing lines, as illustrated in FIG. 5.

This is considered to be because application of a stress to the gas barrier layer due to a load at the time of dicing causes a fracture in the vicinity of a cut portion of the gas barrier layer or formation of a crack in the gas barrier layer, resulting in formation of a breakage D in the gas barrier layer, as illustrated in FIG. 7(c).

When the hardenable pressure sensitive adhesion agent layer of the gas barrier laminate according to the present embodiment has a post-curing storage modulus E1 at 23° C. of 1.0 GPa or more, the rigidity of the entire gas barrier laminate is enhanced. As a result, the deformation due to the stress at the time of singulation can be suppressed, and singulated chips in which the gas barrier layer is not ruptured, as illustrated in FIG. 7(b), can be obtained. As a result, singulated products capable of exhibiting normal sealing performance can be obtained.

On the other hand, it is considered that, when the storage modulus E1 is less than 1.0 GPa, the degree of deformation occurring at a cut end portion due to the stress applied at the time of dicing increases, and thus that the gas barrier layer cannot withstand the deformation and is broken as indicated by a symbol D in FIG. 7(c). For this reason, it is presumed that, even when the above-described side surface sealing layers are provided, moisture or the like enters through the base material 10 and a breakage portion D to cause deterioration in the sensor.

Hardenable Pressure Sensitive Adhesion Agent Layer
(1) Physical Property

In the gas barrier laminate according to the present embodiment, the hardenable pressure sensitive adhesion agent layer has curability. Here, the phrase "has curability" means that the hardenable pressure sensitive adhesion agent layer can be cured by heating or the like. That is, the hardenable pressure sensitive adhesion agent layer is uncured in a state of forming the gas barrier laminate. The hardenable pressure sensitive adhesion agent layer may be thermosetting or energy-ray-curable. However, the hardenable pressure sensitive adhesion agent layer is preferably thermosetting from the perspective that curing can be favorably performed when the gas barrier laminate is used in a method for producing a singulated sealed body. Specifically, when the gas barrier laminate is used in the method for producing a singulated sealed body, the hardenable pressure sensitive adhesion agent layer is singulated in a state of being attached to an adherend such as a semiconductor wafer to form a singulated sealed body, as will be described below. In general, semiconductor wafers do not have energy ray-permeability or have very low energy ray-permeability in many cases, and, even in such cases, if the hardenable pressure sensitive adhesion agent layer has thermosetting properties, the hardenable pressure sensitive adhesion agent layer can be rapidly cured.

(1-1) Storage Modulus

In the gas barrier laminate, the post-curing storage modulus E1 at 23° C. of the hardenable pressure sensitive adhesion agent layer is as described above.

A storage modulus E0 at 23° C. of the hardenable pressure sensitive adhesion agent layer is preferably from 0.01 to 10 MPa, more preferably from 0.1 to 5 MPa, and still more preferably from 0.3 to 1 MPa, from the perspective of allowing the hardenable pressure sensitive adhesion agent layer to follow the shape of the wiring/electrodes to cover the wiring/electrodes without gaps and from the perspective of maintaining an appropriate layer shape.

The storage modulus E0 of the hardenable pressure sensitive adhesion agent layer is measured by the same procedure as that for the storage modulus E1 except that the curing treatment is not performed, and is specifically measured by a method which will be described in the Examples.

(1-2) Thickness and the Like of Adhesion Agent Layer

A thickness of the hardenable pressure sensitive adhesion agent layer is preferably 1 μm or more, more preferably 3 μm or more, and still more preferably 5 μm or more, from the perspective of embeddability into the electric wiring. The upper limit of the thickness is not particularly limited, but is preferably 200 μm or less, more preferably 100 μm or less, still more preferably 50 μm or less, particularly preferably 30 μm or less, and most preferably 15 μm or less, from the perspective of preventing the gas barrier layer from sinking during dicing and keeping the end portion deformation ratio at a low level. In other words, the thickness of the hardenable pressure sensitive adhesion agent layer is preferably from 1 to 200 μm.

The thickness of the hardenable pressure sensitive adhesion agent layer is an arithmetic mean value of thicknesses measured at 100 points, in total, at 50 mm intervals.

A ratio (T2/T1) of the thickness (T2) of the hardenable pressure sensitive adhesion agent layer to the thickness (T1) of the base material is preferably 0.01 or more, particularly preferably 0.05 or more, and further preferably 0.08 or more. Further, the ratio (T2/T1) is preferably 1.5 or less, particularly preferably 1.0 or less, and further preferably 0.9 or less. In other words, T2/T1 is preferably from 0.01 to 1.5.

When the ratio (T2/T1) is within the above range, the balance in thickness between the base material and the hardenable pressure sensitive adhesion agent layer is good, the handleability when the gas barrier laminate is attached to an adherend such as a semi-conductor wafer is excellent, and attachment suitability when the gas barrier laminate is attached to the adherend can be easily adjusted. As a result, the attachment can be favorably performed, and, finally, a singulated sealed body having excellent qualities can be obtained. In particular, when the ratio (T2/T1) is 0.01 or more, a relative thickness of the base material in the gas barrier laminate is relatively small, and a relative rigidity of the gas barrier laminate is kept at a relatively low level. As a result, when the gas barrier laminate is attached to an adherend such as a semiconductor wafer, the electric wiring formed on the adherend is easily embedded in the hardenable pressure sensitive adhesion agent layer favorably. On the other hand, when the ratio (T2/T1) is 1.5 or less, the relative thicknesses of the base material in the gas barrier laminate is relatively large, and the relative rigidity of the gas barrier laminate is maintained at a relatively high level. As a result, the handleability of the gas barrier laminate becomes excellent, and a gas barrier laminate can be easily attached to an adherend such as a semiconductor wafer. The thickness (T1) of the base material is an arithmetic mean value of thicknesses measured at 100 points, in total, at 50 mm intervals.

(2) Material

The hardenable pressure sensitive adhesion agent layer is preferably formed of a curable resin material, and is more preferably a dried product of a coating film of the curable resin material.

The curable resin material preferably contains a thermosetting resin component, a curing agent and/or a curing catalyst, another resin component, and a filler. Hereinafter, each component that can be contained in the curable resin material will be described.

(2-1) Thermosetting Resin Component

Examples of the thermosetting resin component that may be contained in materials forming the hardenable pressure sensitive adhesion agent layer include an epoxy resin, a phenol resin, a melamine resin, a urea resin, a polyester resin, a urethane resin, an acrylic resin, a polyimide resin, and a benzoxazine resin. One of these resins can be used alone, or two or more of the resins can be used in combination. Among them, an epoxy resin and a phenol resin are preferable, and an epoxy resin is particularly preferable, from the perspective of adhesiveness and the like.

The epoxy resin has a property of forming a three-dimensional network when heated, forming a strong cured product. As such an epoxy resin, any of various known epoxy resins may be used, and specific examples thereof include glycidyl ethers of phenols such as bisphenol A, bisphenol F, resorcinol, phenyl novolac, and cresol novolac; glycidyl ethers of alcohols such as butanediol, polyethylene glycol, and polypropylene glycol; glycidyl ethers of carboxylic acids such as phthalic acid, isophthalic acid, and tetrahydrophthalic acid; glycidyl type or alkylglycidyl type epoxy resins in which active hydrogen bonded to a nitrogen atom is substituted with a glycidyl group, such as aniline isocyanurate; and so-called alicyclic epoxies into which epoxy is introduced by, for example, oxidizing a carbon-carbon double bond in the molecule, such as vinylcyclohexanediepoxide, 3,4-epoxycyclohexylmethyl-3,4-dicyclohexanecarboxylate, and 2-(3,4-epoxy)cyclohexyl-5,5-spiro (3,4-epoxy)cyclohexane-m-dioxane. In addition, an epoxy resin having a biphenyl skeleton, a dicyclohexadiene skeleton, a naphthalene skeleton, or the like can also be used. In addition, epoxy resins having three or more epoxy groups in one molecule, such as trishydroxyphenylmethane type epoxy resins and derivatives such as epoxy resins in which corresponding aromatic rings are alkylated may also be used.

Examples of commercially available products that can be used include a tris(hydroxyphenyl) methane type solid epoxy resin "E1032H60" available from Japan Epoxy Resin K. K., a Bis-F type liquid epoxy resin "YL-983U" available from Japan Epoxy Resin K. K., and a long-chain Bis-F modified type epoxy resin "YL-7175" available from Japan Epoxy Resin K. K.

One of these epoxy resins can be used alone, or two or more of the epoxy resins can be used in combination.

A lower limit of a content of the thermosetting resin component in the materials forming the hardenable pressure sensitive adhesion agent layer is preferably 5 mass % or more, and more preferably 10 mass % or more, based on the total amount of the materials forming the hardenable pressure sensitive adhesion agent layer. An upper limit of the content of the thermosetting resin component is preferably 75 mass % or less, and more preferably 55 mass % or less. In other words, the content of the thermosetting resin component is preferably from 5 to 75 mass % based on the total amount of the materials forming the hardenable pressure sensitive adhesion agent layer.

When the content of the thermosetting resin component is within the above range, the pre-curing and post-curing storage moduli at 23° C. can be easily made to be within the above range.

(2-2) Curing Agent and Curing Catalyst

When the materials forming the hardenable pressure sensitive adhesion agent layer contain the above-described thermosetting resin component, the material preferably further contains a curing agent and/or a curing catalyst.

Examples of the curing agent include, but are not particularly limited to, phenols, amines, and thiols. The curing agent can be appropriately selected depending on the type of thermosetting component described above. For example, when an epoxy resin is used as the thermosetting resin component, a phenol is preferable from the perspective of reactivity with the epoxy resin and the like.

Examples of the phenol include bisphenol A, teramethylbisphenol A, diallylbisphenol A, biphenol, bisphenol F, diallylbisphenol F, triphenylmethane type phenol, tetrakisphenol, novolac type phenol, and cresol novolac resin, and one of these phenols can be used alone, or two or more of the phenols can be used in combination.

Examples of the curing catalyst include, but are not limited to, imidazole-based catalysts, phosphorus-based catalysts, and amine-based catalysts. The curing catalyst may be appropriately selected depending on the type of thermosetting component described above.

For example, when an epoxy resin is used as the curable resin component, an imidazole-based curing catalyst is preferably used as the curing catalyst, from the perspective of reactivity with the epoxy resin, storage stability, physical properties of the cured product, curing rate, and the like. As the imidazole-based curing catalyst, known ones can be used, but an imidazole catalyst having a triazine skeleton is preferable from the perspective of excellent curability, storage stability, and the like. One of these catalysts can be used alone, or two or more of the catalysts can be used in combination. They may also be used as microencapsulated latent curing catalysts. The melting point of the imidazole-based curing catalyst is preferably 200° C. or higher, and particularly preferably 250° C. or higher, from the perspective of excellent curability, storage stability, and the like.

The lower limit of the content of the curing catalyst in the materials forming the hardenable pressure sensitive adhesion agent layer is preferably 0.1 mass % or more, more preferably 0.2 mass % or more, and particularly preferably 0.4 mass % or more, based on the total amount of the materials forming the hardenable pressure sensitive adhesion agent layer. An upper limit of the content of the curing catalyst is preferably 10 mass % or less, more preferably 5 mass % or less, and particularly preferably 3 mass % or less. In other words, the content of the curing catalyst is preferably from 0.1 to 10 mass % based on the total amount of materials forming the hardenable pressure sensitive adhesion agent layer.

In the materials forming the hardenable pressure sensitive adhesion agent layer, when the content of the curing catalyst is equal to or higher than the lower limit, the thermosetting resin component can be sufficiently cured. On the other hand, when the content of the curing catalyst is lower than or equal to the upper limit, the storage stability of the hardenable pressure sensitive adhesion agent layer becomes good.

(2-3) Another Resin Component

The materials forming the hardenable pressure sensitive adhesion agent layer preferably contain a resin component other than the above-described thermosetting resin component as another resin component. When the hardenable pressure sensitive adhesion agent layer contains the other resin component, the embeddability of the hardenable pressure sensitive adhesion agent layer into the electric wiring is easily ensured, and thermal expansion of the cured hardenable pressure sensitive adhesion agent layer is easily suppressed from becoming excessively large.

Examples of the other resin component include (meth) acrylic resins, phenoxy resins, polyester resins, polyurethane resins, polyimide resins, polyamide-imide resins, siloxane-modified polyimide resins, polybutadiene resins, polypropylene resins, styrene-butadiene-styrene copolymers, styrene-ethylene-butylene-styrene copolymers, polyacetal resins, polyvinyl acetal resins such as polyvinyl butyral resins, butyl rubbers, chloroprene rubbers, polyamide resins, acrylonitrile-butadiene copolymers, acrylonitrile-butadiene-acrylic acid copolymers, acrylonitrile-butadiene-styrene copolymers, polyvinyl acetate, and nylon. One of the other resin components can be used alone, or two or more of the other resin components can be used in combination.

Among the other resin components described above, it is preferable to use one or more selected from the group consisting of a polyvinyl acetal resin, a polyester resin, and a phenoxy resin.

Here, the polyvinyl acetal resin is obtained by acetalizing, with aldehyde, polyvinyl alcohol obtained by saponifying polyvinyl acetate. Examples of the aldehyde used in the acetalization include n-butylaldehyde, n-hexylaldehyde, and n-valeraldehyde. As the polyvinyl acetal resin, it is also preferable to use a polyvinyl butyral resin acetalized using n-butyl aldehyde.

Examples of the polyester resin include polyester resins obtained by polycondensation of a dicarboxylic acid component and a diol component such as a polyethylene terephthalate resin, a polybutylene terephthalate resin, and a polyethylene oxalate resin; modified polyester resins, such as a urethane-modified polyester resin, obtained by reacting these resins with a polyisocyanate compound; and polyester resins obtained by grafting an acrylic resin and/or a vinyl resin. One of the polyester resins can be used alone, or two or more of the polyester resins can be used in combination.

Examples of the phenoxy resin include, but are not limited to, bisphenol-A type, bisphenol-F type, bisphenol-A/bisphenol-F copolymer type, biphenol type, and biphenyl type resins.

A lower limit of a glass transition temperature of the other resin component is preferably 50° C. or higher, more preferably 60° C. or higher, and particularly preferably 70° C. or higher. An upper limit of the glass transition temperature of the other resin component is preferably 250° C. or lower, more preferably 200° C. or lower, and particularly preferably 100° C. or lower. In other words, the glass transition temperature of the other resin component is preferably from 50 to 250° C.

When the cured hardenable pressure sensitive adhesion agent layer contains the other resin component having a glass transition temperature equal to or higher than the lower limit, thermal expansion of the cured hardenable pressure sensitive adhesion agent layer is easily suppressed from becoming excessively large. In addition, when the glass transition temperature is lower than or equal to the upper limit, compatibility with other materials becomes excellent. The glass transition temperature of the other resin components is a temperature at a maximum point of tan δ (loss elastic modulus/storage modulus) when viscoelasticity is measured in a tensile mode by using a dynamic viscoelasticity measuring instrument (DMAQ800 available from TA Instruments) at a frequency of 11 Hz, an amplitude of 10 µm, and a temperature increase rate of 3° C./min while raising the temperature from 0° C. to 300° C.

The weight average molecular weight of the other resin component is preferably 10,000 or more, more preferably 30,000 or more, and particularly preferably 50,000 or more. The upper limit of the weight average molecular weight is preferably 1,000,000 or less, more preferably 500,000 or less, and particularly preferably 100,000 or less. In other words, the weight average molecular weight of the other resin component is preferably from 10,000 to 1,000,000.

When a weight average molecular weight of equal to or higher than the lower limit is preferable because the embeddability into the electric wiring is easily secured while the film formability is maintained. In addition, a weight average molecular weight of lower than or equal to the upper limit is preferable because the compatibility with the thermosetting resin component is improved. Note that, in the present specification, the weight average molecular weight herein is a value in terms of standard polystyrene measured by the gel permeation chromatography (GPC) method.

A lower limit of a content of the other resin component in the materials forming the hardenable pressure sensitive adhesion agent layer is preferably 3 mass % or more, more preferably 7 mass % or more, and particularly preferably 12 mass % or more, based on the total amount of the materials forming the hardenable pressure sensitive adhesion agent layer. An upper limit of the content of the other resin component is preferably 95 mass % or less, more preferably 80 mass % or less, particularly preferably 40 mass % or less, and still more preferably 25 mass % or less. In other words, the content of the other resin component in the materials forming the hardenable pressure sensitive adhesion agent layer is preferably from 3 to 95 mass %.

When the content of the other resin component is within the above range, the obtained hardenable pressure sensitive adhesion agent is likely to satisfy the above ranges for the pre-curing and post-curing storage moduli at 23° C.

(2-4) Filler

The hardenable pressure sensitive adhesion agent layer preferably contains a filler from the perspective of suppression of volume shrinkage during heat curing and suppression of dimensional change when enduring high temperatures.

The filler used is preferably an inorganic filler.

Examples of the inorganic filler that can be used in the present embodiment include, but are not limited to, silica, alumina, glass, titanium oxide, mica, aluminum hydroxide, magnesium hydroxide, calcium carbonate, magnesium carbonate, calcium silicate, magnesium silicate, calcium oxide, magnesium oxide, aluminum oxide, aluminum nitride, aluminum borate whiskers, boron nitride, crystalline silica, amorphous silica, composite oxides such as mullite and cordierite, montmorillonite, and smectite. One of the inorganic fillers can be used alone, or two or more of the inorganic fillers can be used in combination. Of these, a silica filler is preferred. The silica filler is preferably spherical.

The inorganic filler is preferably surface-modified with a silane coupling agent or the like. When the inorganic filler is surface-modified, a bond can be formed between the filler and other components. As a result, an increase in viscosity of the material forming a hardenable pressure sensitive adhesion agent layer can be suppressed, a low melt viscosity can be obtained, and the average linear expansion coefficient of the material can be further reduced. From the perspective of easily decreasing melt viscosity, the silane coupling agent is preferably a silane coupling agent having a hydrophobic functional group such as an alkyl group, a vinyl group, an acryloyl group, a methacryloyl group, a phenyl group, or an aminophenyl group.

The lower limit of the average particle size of the filler is preferably 10 nm or more, more preferably 20 nm or more, and particularly preferably 30 nm or more. The upper limit of the average particle size of the filler is preferably 200 nm or less, more preferably 150 nm or less, and particularly preferably 100 nm or less. In other words, the average particle size of the filler is preferably from 10 to 200 nm.

When the average particle size of the filler is equal to or higher than the lower limit, it is easy to achieve both transparency of the hardenable pressure sensitive adhesion agent layer and suppression of volume shrinkage during curing and dimensional change when enduring high temperatures. In addition, when the average particle size of the filler is lower than or equal to the upper limit, it is easy to ensure good embeddability into the electric wiring in the materials forming the hardenable pressure sensitive adhesion agent layer.

The average particle size of the filler component is determined, for example, by performing grain size distribution measurement using a laser diffraction particle size analyzer (Mastersizer 3000 available from Malvern Instruments Ltd.).

A maximum particle size of the filler is preferably 1,000 nm or less, and more preferably 500 nm or less. When the maximum particle size of the filler is 1,000 nm or less, the filler is easily filled in the hardenable pressure sensitive adhesion agent layer.

A lower limit of a content of the filler in the materials forming the hardenable pressure sensitive adhesion agent layer is preferably 10 mass % or more, more preferably 20 mass % or more, and particularly preferably 30 mass % or more, based on the total amount of the materials forming the hardenable pressure sensitive adhesion agent layer. An upper limit of the content of the inorganic filler is preferably 80 mass % or less, more preferably 60 mass % or less, and particularly preferably 50 mass % or less. In other words, the content of the filler in the materials forming the hardenable pressure sensitive adhesion agent layer is preferably from 10 to 80 mass % based on the total amount of the materials forming the hardenable pressure sensitive adhesion agent layer.

When the content of the filler in the materials forming the hardenable pressure sensitive adhesion agent layer is within the above range, the obtained hardenable pressure sensitive adhesion agent is likely to satisfy the above ranges for the pre-curing and post-curing storage moduli at 23° C.

(2-5) Other Components

The hardenable pressure sensitive adhesion agent layer may further contain a flux component, a plasticizer, a stabilizer, a tackifier, a colorant, a coupling agent, an antistatic agent, an antioxidant, conductive particles, or the like as a material forming the hardenable pressure sensitive adhesion agent layer.

For example, blending of a flux component which is a component having an action of removing a metal oxide film formed on the surface of the electrode can make the electrical connection between the electrodes by solder more reliable, and enhance the connection reliability at a solder joint.

(3) Method for Forming Hardenable Pressure Sensitive Adhesion Agent Layer

Forming the hardenable pressure sensitive adhesion agent layer involves firstly preparing a coating slip containing materials forming the hardenable pressure sensitive adhesion agent layer and, if desired, an additional solvent or dispersion medium. The coating slip is applied onto a release surface of a release sheet by a die coater, a curtain coater, a spray coater, a slit coater, a knife coater, or the like to form a coating film, and the coating film is dried to form the hardenable pressure sensitive adhesion agent layer. The properties of the coating slip are not particularly limited as long as the coating slip can be applied, and the coating slip may contain a component for forming the hardenable pressure sensitive adhesion agent layer as a solute or a dispersoid. The release sheet may be peeled off as a process material, or may protect the hardenable pressure sensitive adhesion agent layer until it is attached to an adherend such as a semiconductor wafer.

Base Material

As the base material, any of various resin films can be used, and a polyethylene terephthalate (PET) film, a polybutylene terephthalate (PBT) film, a polylactic acid (PLA) film, or the like is preferably used.

These base materials are easily available at low cost and have good optical transparency. The base material may, or may not be, subjected to a primer treatment. Examples of the primer treatment include providing a primer layer, a corona treatment, and a flame treatment.

The base material film may not be subjected to a heat resistance improving treatment such as an annealing treatment, or may be subjected to a heat resistance improving treatment.

Gas Barrier Layer

Examples of the gas barrier layer include an inorganic vapor deposition film such as a vapor deposition film of an inorganic compound or a vapor deposition film of a metal; and a layer obtained by subjecting a layer containing a polymer compound (hereinafter sometimes referred to as "polymer layer") to a modification treatment such as ion implantation. In this case, the inorganic layer refers to not only the modified region but also the entire "modified polymer layer". That is, when the inorganic layer is a layer obtained by subjecting a polymer layer to a modification treatment, the entire layer does not need to be made of an inorganic compound.

Examples of a raw material of the inorganic compound vapor deposition film include: inorganic oxides, such as silicon oxide, aluminum oxide, magnesium oxide, zinc oxide, indium oxide, and tin oxide; inorganic nitrides, such as silicon nitride, aluminum nitride, and titanium nitride; inorganic carbides; inorganic sulfides; inorganic oxynitrides, such as silicon oxynitride; inorganic oxycarbides; inorganic carbonitrides; and inorganic oxycarbonitrides.

One of these raw materials can be used alone, or two or more of these raw materials can be used in combination.

Examples of a raw material of the metal vapor deposition film include aluminum, magnesium, zinc, and tin.

One of these raw materials can be used alone, or two or more of these raw materials can be used in combination.

Among these, an inorganic vapor deposition film made from an inorganic oxide, an inorganic nitride, or a metal is preferable from the perspective of gas barrier properties; furthermore, an inorganic vapor deposition film made from an inorganic oxide or an inorganic nitride is preferable from the perspective of transparency.

Examples of the method for forming the inorganic vapor deposition film include a physical vapor deposition (PVD) method, such as vacuum deposition, sputtering, and ion plating, or a chemical vapor deposition (CVD) method, such as thermal CVD, plasma CVD, and optical CVD.

The thickness of the inorganic vapor deposition film varies depending on the inorganic compound used, but is usually 5 nm or more, preferably 10 nm or more, more preferably 100 nm or more, and still more preferably 300 nm or more from the viewpoint of ensuring the gas barrier properties, and is usually 5,000 nm or less, preferably 1,400 nm or less, and more preferably 700 nm or less from the viewpoint of suppressing formation of a crack and the like. In other words, the thickness of the inorganic vapor deposition film is preferably from 10 to 5,000 nm.

In addition, the inorganic vapor deposition film may be a single layer or may be two or more layers having a total thickness within the above range. In a case where the inorganic vapor deposition film is two or more layers, the same materials may be used in combination, or different materials may be used in combination.

In the gas barrier layer formed from a layer containing a silicon-containing polymer compound (hereinafter, sometimes referred to as "silicon-containing polymer layer"), one silicon-containing polymer compound may be used alone, or two or more silicon-containing polymer compounds may be used in combination.

Examples of the silicon-containing polymer compound include: a polysilazane-based compound (see Japanese Patent JP 63-16325 B, Japanese Unexamined Patent Application Publication JP 62-195024 A, JP 63-81122 A, JP 1-138108 A, JP 2-84437 A, JP 2-175726 A, JP 4-63833 A, JP 5-238827 A, JP 5-345826 A. JP 2005-36089 A, JP 6-122852 A, JP 6-299118 A. JP 6-306329 A, JP 9-31333 A, JP 10-245436 A, JP 2003-514822 T, and International Patent Application WO 2011/107018); a polycarbosilane-based compound (see Journal of Materials Science, 2569-2576, Vol. 13, 1978; Organometallics, 1336-1344, Vol. 10, 1991; Journal of Organometallic Chemistry, 1-10, Vol. 521, 1996; Japanese Unexamined Patent Application Publication JP 51-126300 A, JP 2001-328991 A. JP 2006-117917 A. JP 2009-286891 A, and JP 2010-106100 A); and a polysilane-based compound [R. D. Miller, J. Michl; Chemical Review, Vol 89, Page 1359 (1989), N. Matsumoto; Japanese Journal of Physics, Vol. 37, Page 5425 (1998); and Japanese Unexamined Patent Application Publication JP 2008-63586 A, and JP 2009-235358 A].

Of these, a polysilazane-based compound is preferable from the perspective of capability to form a gas barrier layer having excellent gas barrier properties. Examples of the polysilazane-based compound include an inorganic polysilazane and an organic polysilazane. Examples of the inorganic polysilazane include perhydropolysilazane, and examples of the organic polysilazane include a compound in which some or all of the hydrogen in perhydropolysilazane is substituted with an organic group such as an alkyl group. Of these, an inorganic polysilazane is more preferable from the perspective of ease of access and being able to form a gas barrier layer having excellent gas barrier properties.

Further, as the polysilazane compound, a commercially available product sold as a glass coating material or the like can be used as is.

One type of polysilazane compound can be used alone or two or more types of polysilazane compound can be used in combination.

In addition to the silicon-containing polymer compound described above, the silicon-containing polymer layer may contain another component within a range that does not inhibit the object of the present invention. Examples of the other component include a curing agent, another polymer, an anti-aging agent, a light stabilizer, and a flame retardant.

The content of the silicon-containing polymer compound in the silicon-containing polymer layer is preferably 50 mass % or more, more preferably 70 mass % or more, from the perspective of forming a gas barrier layer exhibiting excellent gas barrier properties.

Examples of the method for forming the silicon-containing polymer layer include a method in which a layer forming solution containing at least one silicon-containing polymer compound, optionally other components, a solvent, and the like is applied onto a base material film by a known method, and the obtained coating film is appropriately dried to form the silicon-containing polymer layer.

During the formation of the gas barrier layer, when, for example, a polysilazane-based compound as described above is used, a polysilazane conversion reaction occurs by heating after coating, resulting in a film having gas barrier properties.

The thickness of the silicon-containing polymer layer is preferably from 10 to 1,500 nm, more preferably from 20 to 1,000 nm, still more preferably from 30 to 600 nm, and still more preferably from 40 to 400 nm.

Even if the thickness of the silicon-containing polymer layer is in the order of nanometers, a gas barrier film having sufficient gas barrier performance can be obtained by performing a modification treatment later.

Before the modification treatment, a treatment for promoting the conversion reaction of the silicon-containing polymer compound may be performed. Examples of such a treatment include (a) an ultraviolet irradiation treatment, (b) a steam treatment in which water vapor is sprayed onto the coating film of the composition containing the silicon-containing polymer compound, and (c) a method of storing the coating film in an environment of from about 30 to 60° C. for a long period of 180 hours or more. The conversion reaction is promoted by ultraviolet irradiation from the perspective of simplicity of the treatment and capability of being carried out in a short time.

Examples of ions to be implanted include ions of noble gases such as helium, argon, neon, krypton, and xenon; ions of fluorocarbon, hydrogen, nitrogen, oxygen, carbon dioxide, chlorine, fluorine, and sulfur;

ions of alkane-based gases such as methane, ethane, propane, butane, pentane, and hexane; ions of alkene-based gases such as ethylene, propylene, butene, and pentene; ions of alkadiene-based gases such as pentadiene and butadiene; ions of alkyne-based gases such as acetylene and methyl acetylene; ions of aromatic hydrocarbon-based gases such as benzene, toluene, xylene, indene, naphthalene, and phenanthrene; ions of cycloalkane-based gases such as cyclopropane and cyclohexane; ions of cycloalkene-based gases such as cyclopentene and cyclohexene;

ions of conductive metals such as gold, silver, copper, platinum, nickel, palladium, chromium, titanium, molybdenum, niobium, tantalum, tungsten, and aluminum; and ions of silane ($SiH_4$) or organosilicon compounds.

One type of these ions may be used alone or two or more types of the ions may be used in combination.

Of these, at least one species of ions selected from the group consisting of hydrogen, nitrogen, oxygen, argon, helium, neon, xenon, and krypton is preferable because of easier ion implantation and because a gas barrier layer having superior gas barrier properties can be obtained.

The method of ion implantation is not limited, and examples include a method of irradiating ions (ion beam) accelerated by an electric field and a method of implanting plasma ions. Of these, the latter, a method of implanting plasma ions, is preferable because a film having gas barrier properties can be easily obtained.

The plasma ion implantation method is preferably: (I) a method of implanting ions present in a plasma generated using an external electric field into the silicon-containing polymer layer; or (II) a method of implanting ions present in a plasma generated only by an electric field generated by a negative high-voltage pulse applied to the layer into the silicon-containing polymer layer without using an external electric field.

In the method (I), the pressure during ion implantation (pressure during plasma ion implantation) is preferably from 0.01 to 1 Pa. When the pressure during plasma ion implantation is within this range, ions can be easily, efficiently, and uniformly implanted, and the target gas barrier layer can be efficiently formed.

The method (II) does not require increasing the degree of depressurization, employs a simple processing operation, and can reduce the processing time greatly. Also, the entire layer can be treated uniformly, and ions in the plasma can be continuously implanted into the silicon-containing polymer layer with high energy when a negative high-voltage pulse is applied. Furthermore, high-quality ions can be implanted uniformly into the silicon-containing polymer layer by simply applying a negative high-voltage pulse to the layer without requiring any other special means such as a high-frequency power source such as a radio frequency (abbreviated as "RF" hereafter) or microwave power source.

In either of the above methods (I) and (II), a pulse width when applying a negative high-voltage pulse, that is, during ion implantation, is preferably from 1 to 15 usec. When the pulse width is within this range, ions can be implanted more easily, efficiently, and uniformly.

Furthermore, the applied voltage when generating plasma is preferably from −1 to −50 kV, more preferably from −1 to −30 kV, and particularly preferably from −5 to −20 kV. When ion implantation is performed at an applied voltage of more than −1 kV, the ion implantation amount (dose) is insufficient, and the desired performance cannot be obtained. Meanwhile, when ion implantation is performed at an applied voltage of less than −50 kV, the film builds up static charge during ion implantation, and problems such as coloration of the film occur, which is not preferable.

Examples of the ion species used in plasma ion implantation include the same as those exemplified as the ions to be implanted.

A plasma ion implantation apparatus is used during the process of implanting ions in a plasma into the silicon-containing polymer layer.

Specific examples of the plasma ion implantation apparatus include: (i) an apparatus that uniformly surrounds a silicon-containing polymer layer (hereinafter may be referred to as "target ion implantation layer") with a plasma by superimposing high-frequency power on a feedthrough that applies a negative high-voltage pulse to the target ion implantation layer so as to attract, implant, collide, and deposit ions in the plasma (see Japanese Unexamined Patent Application Publication JP 2001-26887 A); (ii) an apparatus having an antenna provided in a chamber, the apparatus, after high-frequency power is applied to generate a plasma and after the plasma reaches the periphery of a target ion implantation layer, alternately applying positive and negative pulses to the target ion implantation layer so as to heat up the target ion implantation layer by attracting and colliding electrons in the plasma using the positive pulse and to attract and implant ions in the plasma by applying the negative pulse while controlling the pulse constant and the temperature (see Japanese Unexamined Patent Application JP 2001-156013 A); (iii) a plasma ion implantation apparatus that generates a plasma using an external electric field, such as a high-frequency power source such as microwave, and applies a high-voltage pulse to attract and implant ions in the plasma; and (iv) a plasma ion implantation apparatus that implants ions in the plasma generated only by the electric field generated by applying a high-voltage pulse without using an external electric field.

Among these, the plasma ion implantation apparatus of (iii) or (iv) is preferable because the processing operation is simple, the processing time can be greatly reduced, and the apparatus is suitable for continuous use.

Methods that employ the plasma ion implantation apparatuses of (iii) and (iv) are described in International Patent Application WO 2010/021326.

In the plasma ion implantation apparatuses of (iii) and (iv), a high-voltage pulse power supply is also used as a plasma generating means for generating plasma. Therefore, other special means such as a high-frequency power source such as an RF or microwave power source are not necessary, and by simply applying a negative high-voltage pulse, a plasma can be generated, and ions in the plasma can be continuously implanted into a silicon-containing polymer layer. As such, a silicon-containing polymer layer having a portion modified by ion implantation on the surface, that is, a gas barrier laminate in which a gas barrier layer is formed, can be mass-produced.

The thickness of the portion where ions are implanted can be controlled by implantation conditions, such as the species of ions, the applied voltage, and the processing time, and can be determined according to, for example, the thickness of the silicon-containing polymer layer and the intended use of the gas barrier laminate, but is typically from 5 to 1000 nm.

The fact that ions have been implanted can be confirmed by performing elemental analysis measurement at a position approximately 10 nm from the surface of the silicon-containing polymer layer, for example, using X-ray photoelectron spectroscopy (XPS).

The water vapor transmission rate of the silicon-containing polymer layer in a state before the modification treatment in an atmosphere of 40° C. and 90% relative humidity is typically 1.0 g/m²/day or less, preferably 0.8 g/m²/day or less, more preferably 0.5 g/m²/day or less, and even more preferably 0.1 g/m²/day or less. The water vapor transmission rate can be measured by a known method.

From the perspective of appropriately promoting the conversion reaction of the silicon-containing polymer compound, in the modified region, a ratio of oxygen atoms to nitrogen atoms represented by an average element ratio in the thickness direction (average at 15 points at equal intervals in the entire thickness region of the modified region) [average at % of oxygen atoms]/[average at % of nitrogen atoms] in X-ray photoelectron spectroscopy is preferably from 1.0 to 6.0, more preferably from 1.0 to 5.5, even more preferably from 1.0 to 5.2, and still more preferably from 1.0 to 4.9.

The gas barrier layer preferably includes a modified layer obtained by ion implantation and/or a chemical vapor deposition layer from the perspective of securing high gas barrier properties.

The water vapor transmission rate of the gas barrier layer in an atmosphere of 40° C. and 90% relative humidity is preferably $1.0 \times 10^{-2}$ g/m²/day or less, preferably $5.0 \times 10^{-3}$ g/m²/day or less, and preferably $9.0 \times 10^{-4}$ g/m²/day or less.

The water vapor transmission rate is specifically measured by a method which will be described in the Examples.

Release Sheet and Protective Film

The release sheet has a role of protecting the base material film when, for example, storing and transporting the gas barrier laminate, and is peeled off in a predetermined step.

The release sheet is preferably in the shape of a sheet or a film. The shape of a sheet or a film is not limited to an elongated shape and also includes the shape of a short flat plate.

Examples of the release sheet include: a paper base material such as glassine paper, coated paper, and wood-free paper; a laminated paper in which a thermoplastic resin such as polyethylene or polypropylene is laminated on such a paper base material; the paper base material described above sealed with, for example, cellulose, starch, polyvinyl alcohol, or acrylic-styrene resin; or, a plastic film, such as a polyester film such as polyethylene terephthalate, polybutylene terephthalate, and polyethylene naphthalate, and a polyolefin film such as polyethylene and polypropylene; and glass.

Furthermore, the release sheet may have a release agent layer provided on a paper base material or a plastic film from the perspective of ease of handling. The release layer, when provided, can be formed using a known release agent, such as a silicone-based release agent, a fluorine-based release agent, an alkyd-based release agent, and an olefin-based release agent.

The protective film has a role of protecting the gas barrier layer when, for example, storing and transporting the gas barrier laminate, and is peeled off in a predetermined step.

The protective film is preferably in the shape of a sheet or a film. The shape of a sheet or a film is not limited to an elongated shape and also includes the shape of a short flat plate.

Since the protective film is usually attached to the surface of the gas barrier layer after the gas barrier layer is formed, the pressure sensitive adhesive layer is preferably provided on the base material from the perspective of preventing unintentional detachment of the protective film from the gas barrier layer. In this case, the pressure sensitive adhesive layer is provided on the surface of the protective film on the gas barrier layer side. When the protective film has the pressure sensitive adhesive layer, the protective film releasably adheres to the gas barrier layer. As the base material of the protective film, a base material having the same material and thickness as those of the release sheet can be used.

Examples of the pressure sensitive adhesive forming the pressure sensitive adhesive layer include an acrylic pressure sensitive adhesive, a urethane-based pressure sensitive adhesive, a silicone-based pressure sensitive adhesive, a rubber-based pressure sensitive adhesive, a pressure sensitive adhesive containing a polyolefin-based polymer, and a pressure sensitive adhesive containing a polyolefin-based copolymer. The pressure sensitive adhesive layer more preferably contains a polyolefin-based polymer and/or a polyolefin-based copolymer. Examples of the polyolefin-based polymer include polyethylene and polypropylene, and examples of the polyolefin-based copolymer include an ethylene-vinyl acetate copolymer and an ethylene-(meth)acrylic acid copolymer.

Examples of commercially available protective films containing a polyolefin-based pressure sensitive adhesive, which can be used as the protective film (B), include SANITECT PAC-3-50THK and SANITECT PAC-2-70 available from Sun A. Kaken Co., Ltd.

Method for Producing Gas Barrier Laminate

A method for producing a gas barrier film according to an embodiment of the present invention includes the following steps:

step 1: forming a gas barrier layer on a base material; and step 2: forming a hardenable pressure sensitive adhesion agent layer on the gas barrier layer.

The step 1 includes an application step of applying a composition containing a silicon-containing polymer compound on a base material to form a coating film, and a step of heating the coating film to form a silicon-containing polymer layer. The method preferably includes a modification step of performing a modification treatment after the heating step.

In addition, the step 1 includes a step of forming a gas barrier layer made of a vapor deposition film of an inorganic compound or a metal by a vapor deposition method such as chemical vapor deposition.

The details of each step are as described above in the "Application of Gas Barrier Laminate" and the like.

The step 2 includes a method of preparing a coating slip containing materials forming the hardenable pressure sensitive adhesion agent layer as described above, applying the coating slip onto a support to form a hardenable pressure sensitive adhesion agent layer, and transferring the layer onto a gas barrier layer, and a method of applying a hardenable pressure sensitive adhesion material onto a gas barrier layer to form a hardenable pressure sensitive adhesion material layer.

Singulated Sealed Body

A singulated sealed body according to an embodiment of the present invention is a singulated product of a composite including: a gas barrier laminate including a base material, a gas barrier layer, and a hardenable pressure sensitive adhesion agent layer in this order; and a workpiece to which the hardenable pressure sensitive adhesion agent layer of the gas barrier laminate is attached and whose surface is sealed. Preferably, the hardenable pressure sensitive adhesion agent layer has a post-curing storage modulus E1 at 23° C. of 1.0 GPa or more.

In the singulated sealed body, the storage modulus E1 of the hardenable pressure sensitive adhesion agent layer is 1.0 GPa or more, and thus, when the composite is cut and singulated, deformation at a cut end portion is suppressed, and breakage of the gas barrier layer is avoided. Therefore, a sealed body exhibiting intended sealability is obtained.

The singulated sealed body may have the cut surface of the singulated product sealed by a side surface sealing layer. The sealability can be further enhanced by providing the side surface sealing layer.

The workpiece is, for example, a semiconductor wafer on which electric wiring is formed. The singulated sealed body is a semiconductor module such as a sensor device, for example.

The details of each part forming the singulated sealed body are as described above.

Method for Producing Singulated Sealed Body

A method for producing a sealed body according to an embodiment of the present invention includes:

a step of attaching the hardenable pressure sensitive adhesion agent layer of the gas barrier laminate to a surface of a workpiece to seal the surface of the workpiece; and a step of cutting the workpiece whose surface is sealed by the gas barrier laminate to obtain a singulated sealed body.

The workpiece is cut in a state where the gas barrier laminate including the gas barrier layer is attached, and thus can be singulated without causing breakage in the gas barrier layer, and singulated products having excellent gas barrier properties and scalability can be obtained.

The hardenable pressure sensitive adhesion agent layer is preferably cured by performing a curing treatment after being attached to the workpiece, and more preferably has a post-curing storage modulus E1 at 23° C. of 1.0 GPa or more.

The details of each step are as described above in the "Application of Gas Barrier Laminate" and the like.

EXAMPLES

The present invention will now be described in greater detail by way of examples, but the present invention is not limited by these examples.

The storage moduli of the hardenable pressure sensitive adhesion agent layer and the water vapor transmission rate of the gas barrier laminate prepared in each of the Examples and the Comparative Examples were measured by the following procedures. In addition, the preparation of singulated chips and the measurement of the end portion deformation ratio and electric resistance change ratio of the singulated chips in the Examples and the Comparative Examples were performed by the following procedures.

Storage Modulus of Hardenable Pressure Sensitive Adhesion Agent Layer

A plurality of uncured hardenable pressure sensitive adhesion agent layers a to d which will be described below were laminated at 23° C. using a laminator so as to achieve a total thickness of 200 μm, and then thermally cured under the thermal curing conditions described in the following "Preparation of singulated chip" to prepare a measurement sample. The storage modulus of the obtained measurement sample was measured in a temperature range of from −20° C. to +150° C. using a storage modulus measuring apparatus (available from TA Instruments, trade name: DMAQ800) under the conditions of a frequency of 11 Hz, an amplitude of 5 μm, and a temperature increase rate of 3° C./min. The value at 23° C. was taken as the post-curing storage modulus E1 at 23° C. In addition, the hardenable pressure sensitive adhesion agent layers a to c were subjected to measurement by the same procedure except that thermal curing was not performed, and the value at 23° C. was taken as the storage modulus E0 at 23° C. of the hardenable pressure sensitive adhesion agent layer.

The uncured hardenable pressure sensitive adhesion agent layers d in Comparative Examples 1 and 2 were laminated at 23° C. using a laminator so that the total thicknesses were 1 mm to prepare measurement samples. The storage modulus of the measurement sample was measured in the temperature range of from −20° C. to +150° C. using a storage modulus measuring apparatus (available from Anton Paar, trade name: Physica MCR301) under the conditions a frequency of 1 Hz, a strain of 1%, and a temperature increase rate of 3° C./min. The value at 23° C. was taken as the storage modulus E0.

Confirmation of Curing of Hardenable Pressure Sensitive Adhesion Agent Layer

Hardenable pressure sensitive adhesion agent layers a to d were prepared in the same manner as in the following "Preparation of Hardenable Pressure Sensitive Adhesion Agent. Layers a to c" and "Hardenable Pressure Sensitive Adhesion Agent Layer d". Then, the gel fraction was measured by the following method after the sample was left under the following thermal curing condition A or B. Based on the measurement results, the difference in gel fraction (points) was obtained by subtracting the gel fraction of sample A from the gel fraction of sample B. As a result, in all of the hardenable pressure sensitive adhesion agent layers a to d, the difference was 10 points or less, and it was confirmed that curing was sufficiently performed under the thermal curing condition A.

Thermal Curing Condition

A: 150° C., 1 hour
B: 150° C., 3 hours

However, the hardenable pressure sensitive adhesion agent layer d was thermally cured at 100° C. instead of 150° C.

Measurement of Gel Fraction

The hardenable pressure sensitive adhesion agent layer subjected to the heat curing condition A or B was cut into a size of 80 mm×80 mm, the release film was peeled off, the hardenable pressure sensitive adhesion agent layer was wrapped in a polyester mesh (mesh size: 200), the mass thereof was weighed with a precision balance, and the mass of the mesh alone was subtracted from the weighed mass to calculate the mass of the hardenable pressure sensitive adhesion agent layer alone. The mass at this time is defined as M1.

Next, the hardenable pressure sensitive adhesion agent layer wrapped in the polyester mesh was immersed in ethyl acetate at room temperature (23° C.) for 24 hours. Thereafter, the hardenable pressure sensitive adhesion agent layer was taken out, air-dried under an environment of 23° C. temperature and 50% relative humidity for 24 hours, and further dried in an oven at 80° C. for 12 hours. After drying, the mass was measured with a precision balance, and the mass of the pressure sensitive adhesive alone was calculated by subtracting the mass of the mesh alone. The mass at this time is defined as M2. The gel fraction (%) is represented by (M2/M1)×100.

Water Vapor Transmission Rate of Gas Barrier Laminate

A water vapor transmission rate measuring apparatus (AQUATRAN (registered trade mark)-2 available from MOCON Inc.) was used to measure the water vapor transmission rate of each of the gas barrier laminates obtained in the Examples and the Comparative Examples under the conditions: 90% RH and 40° C.

Light Transmittance of Gas Barrier Laminate

The release film was peeled off from each of the gas barrier laminates obtained in the Examples and the Comparative Examples, and the light transmittance (%) was measured using an ultraviolet-visible-near infrared (UV-Vis-NIR) spectrophotometer (available from Shimadzu Corporation, product name: "UV-3600"). A case where the light transmittance was 85% or more in a wavelength region at any of wavelengths of from 380 to 780 nm was evaluated as "G", and a case where the light transmittance was not 85% or more was evaluated as "NG". The results are shown in Table 2.

Preparation of Singulated Chip

A silicon wafer (200 mm diameter, 500 μm thick) was used as a base material, and a vacuum vapor deposition apparatus (available from ALS Technology Co., Ltd., E200LL) was used to form a film of calcium for forming wiring in a predetermined pattern, the film having a line width of 3 mm and a thickness of 200 om, and then to form a film of copper for forming an electrode in a predetermined pattern, the film having a line width of 5 mm and a line width of 1 μm, thereby preparing an electric-wiring-attached wafer.

Next, the hardenable pressure sensitive adhesion agent layer prepared by the procedure which will be described below was bonded, by a laminator, on a gas barrier surface of the gas barrier film (gas barrier layer/polyethylene terephthalate) prepared by the procedure which will be described below to prepare a gas barrier laminate.

Next, the hardenable pressure sensitive adhesion agent layer of the gas barrier laminate was bonded onto an electric wiring formation surface of the electric-wiring-attached wafer to obtain a composite.

The composite was heat-treated to thermally cure the hardenable pressure sensitive adhesion agent layer (thermal curing treatment). The conditions for the thermal curing treatment were 150° C. and 1 hour in Examples 1 to 7 which will be described later, and 100° C. and 1 hour in Comparative Example 1 which will be described later. In Comparative Example 2 which will be described later, the thermal curing treatment was not performed.

A part of the gas barrier laminate was peeled off and removed from the composite so that a lead-out electrode of the electric wiring was exposed.

Thereafter, a fully automatic multi-wafer mounter (RAD 2700F/12 available from LINTEC Corporation), an ultraviolet-curable dicing tape (Adwill D-678 available from LINTEC Corporation) was attached to a back surface of the silicon wafer (i.e., a surface opposite to the electric wiring formation surface), and the composite was fixed to the ring frame with the dicing tape.

Subsequently, the composite body was diced using a fully automatic dicing saw (DFD651 available from DISCO Corporation) to obtain a plurality of quadrangular singulated chips (10 mm×10 mm). The dicing was performed so that the calcium layer and the copper layer were cut.

Further, the dicing tape to which the singulated chips in an aligned state adhered was subjected to UV irradiation (illuminance: 230 mW/cm², light quantity: 180 mJ/cm², under a nitrogen gas atmosphere) using a semi-automatic UV irradiation apparatus (RAD-2000m/12 available from LINTEC Corporation), the adhesive strength of the dicing tape was reduced, and the dicing tape was peeled off from the dicing tape, thereby obtaining a singulated chip as a single body.

End Portion Deformation Ratio

An end portion cut surface of each of the quadrangular singulated chips obtained in the Examples and the Comparative Examples was observed using an optical microscope (VHX-5000 available from KEYENCE Corporation, magnification: 3,000 times), and the end portion deformation ratio of the hardenable pressure sensitive adhesion agent layer after dicing was calculated using the following equation (1) based on the thicknesses of a side portion (non-deformed portion) and a corner portion (deformed portion) of the singulated chip.

End portion deformation ratio[%]=(thickness of corner portion/thickness of side portion)×100    Equation (1)

Electrical Resistance Deformation Ratio

On the four side surfaces (cross sections) of each of the singulated chips obtained in the Examples and the Comparative Examples, $SiO_2$ was deposited to a thickness of 500 nm by a DC-magnetron sputtering method to form side surface sealing layers. Then, the electric resistance of the metal wiring of the singulated chip provided with the side surface sealing layers was measured. Next, the singulated chip provided with the side surface sealing layers was placed in a moist heat environment of 90% RH and 60° C. for 500 hours, and then the electric resistance of the wiring was measured. Based on the electrical resistance values before and after the singulated chip was put into the moist heat environment, the electrical resistance deformation ratio was calculated using the following equation (2).

Electrical resistance deformation ratio [%]=(electrical resistance after being put into moist heat environment/initial value)×100    Equation (2)

Preparation of Gas Barrier Film

Gas Barrier Film A

Perhydropolysilazane (AQUAMICA NL110A available from Merck & Co., Ltd.) was applied onto a non-treated surface (PET surface) of a 50 μm-thick polyethylene terephthalate (PET) film (A-4160 available from Toyobo Co., Ltd.) which had been subjected to a primer treatment on one side, and the coated film was heated and cured at 120° C. for 2 minutes to form a polysilazane layer. The polysilazane layer had a thickness of 200 nm.

Next, plasma ions were implanted into the polysilazane layer using a plasma ion implantation apparatus under the following conditions to modify a surface of the polysilazane layer, thereby obtaining a first gas barrier layer. Next, a second gas barrier layer was formed by the same procedure to obtain a gas barrier film A. The gas barrier film A had a water vapor transmission rate of $4.8 \times 10^{-4}$ g·m$^{-2}$·day$^{-1}$.

The plasma ion implantation apparatus and plasma ion implantation conditions used in the modification treatment are as follows.

Plasma Ion Implantation Apparatus

RF power source: model number "RF56000" available from JEOL Ltd.

High-voltage pulse power supply: "PV-3-HSHV-0835" available from Kurita Manufacturing Corporation Plasma Ion Implantation Condition Plasma generation gas: Ar
Gas flow rate: 100 sccm
Duty ratio: 0.5%
Repetition frequency: 1,000 Hz
Applied voltage: −10 kV
RF power source: frequency of 13.56 MHz and applied power of 1,000 W
Chamber internal pressure: 0.2 Pa
Pulse width: 5 usec
Treatment time (ion implantation time): 200 seconds Gas Barrier Film B A 500-nm-thick silicon-oxide film ($SiO_x$ film: x=2.33) was formed, by plasma chemical vapor deposition, on a non-treated surface (PET surface) of a 50-μm-thick polyethylene terephthalate (PET) film (A-4160 available from Toyobo Co., Ltd.) which had been subjected to a primer treatment on one side to obtain a gas barrier film B.

The water vapor transmission rate of the gas barrier film B was $8.9 \times 10^{-4}$ g·m$^{-2}$·day$^{-1}$.

The conditions for the plasma chemical vapor deposition method are as follows.

Precursor: hexamethyldisiloxane
Flow rate of hexamethyldisiloxane: 50 sccm
Flow rate of argon gas: 15 sccm
Flow rate of oxygen gas: 10 sccm
Chamber internal pressure: 0.3 Pa Power of RF power source: 1,000 W
Film formation time: 250 seconds Gas Barrier Film C Perhydropolysilazane (Aquamica NL110A available from Merck & Co., Inc.) was applied onto a gas barrier surface of the gas barrier film B under the same preparation conditions as those for the gas barrier film A, and the coated film was heated and cured at 120° C. for 2 minutes to form a polysilazane layer. The polysilazane layer had a thickness of 200 nm.

Next, plasma ions were implanted into the polysilazane layer using a plasma ion implantation apparatus under the following conditions to modify a surface of the polysilazane layer, thereby obtaining a gas barrier film C. The water vapor transmission rate of the gas barrier film C was $5.9 \times 10.5$ $g \cdot m^{-2} \cdot day^{-1}$.

Preparation of Hardenable Pressure Sensitive Adhesion Agent Layers a to c

The respective components were mixed according to the formulation shown in Table 1, and methyl ethyl ketone was added as a solvent to adjust the solid content concentration to 20 mass %, thereby preparing hardenable pressure sensitive adhesion agents a to c. These hardenable pressure sensitive adhesion agents were individually applied onto a silicone-treated release film (SP PET381031 available from LINTEC Corporation), and the obtained coating films were dried in an oven at 100° C. for 1 minute to prepare hardenable pressure sensitive adhesion agent layers having the thicknesses shown in Table 2. Hereinafter, the hardenable pressure sensitive adhesion agent layers prepared using the hardenable pressure sensitive adhesion agents a to c are also referred to as hardenable pressure sensitive adhesion agent layers a to c.

TABLE 1

| | Component name | Compound name | Hardenable pressure sensitive adhesion agent | | |
|---|---|---|---|---|---|
| | | | a | b | c |
| Blended amount [parts by mass] | Resin component | BPA/BPF copolymerized type phenoxy resin | 16.3 | 16.3 | 38.5 |
| | | Tris(hydroxyphenyl)methane type solid epoxy resin | 24.5 | 13.0 | 24.5 |
| | | Bis-F type liquid epoxy resin | 8.2 | 16.4 | 8.2 |
| | | Long-chain bis-F modified type epoxy resin | 2.7 | 6.0 | 27.0 |
| | Curing catalyst | 2,4-Diamino-6-[2'-methylimidazolyl-(1')]-ethyl-s-triazine | 1.1 | 1.1 | 1.1 |
| | Filler | Surface-modified silica filler | 47.2 | 47.2 | 25.0 |

*Meanings of abbreviations in Table 1
BPA: bisphenol A
BPF: bisphenol F

The materials used for preparing the hardenable pressure sensitive adhesion agents a to c are as follows.

Bisphenol A (BPA)/bisphenol F (BPF) copolymer type phenoxy resin: ZX-1356-2 available from Tohto Kasei Co., Ltd. (glass transition temperature: 71° C., weight average molecular weight: 60,000)

Tris(hydroxy phenyl) methane type solid epoxy resin: E1032H60 available from Japan Epoxy Resin K.K.

Bis-F type liquid epoxy resin: YL-983U available from Japan Epoxy Resin K.K.

Long-chain Bis-F modified type epoxy resin: YL-7175 available from Japan Epoxy Resin K.K.

2,4-Diamino-6-[2'-methylimidazolyl-(1')]-ethyl-s-triazine: 2MZA-PW available from Shikoku Chemicals Corporation Surface-modified silica filler: average particle size: 100 nm, maximum particle size: 450 nm Hardenable Pressure Sensitive Adhesion Agent Layer d A coating slip having a solid concentration of 20 mass % was prepared by dissolving, in methyl ethyl ketone, 100 parts by mass of a modified polyolefin-based resin (acid-modified α-olefin polymer available from Mitsui Chemicals, Inc., trade name: Unistole H-200, weight average molecular weight: 52,000, functional group: carboxyl group, glass transition temperature: 25° C.), 100 parts by mass of a compound having a cyclic ether group (available from Nissan Chemical Corporation, trade name: TEPIC-FL, molecular weight: 525, functional group: glycidyl group), 1 part by mass of a cationic polymerization initiator (available from Sanshin Chemical Industry Co., Ltd., trade name: SAN-AID SI-B2A) as a curing catalyst, and 0.2 parts by mass of a silane coupling agent (available from Shin-Etsu Chemical Co., Ltd., trade name: KBM 4803).

This coating slip was applied onto a release-treated surface of a release film (available from LINTEC Corporation, trade name "SP-PET382150"), the obtained coating film was dried at 100° C. for 2 minutes to prepare a hardenable pressure sensitive adhesion agent layer d having a thickness of 10 μm.

Example 1

On the gas barrier surface side of the gas barrier film A, the hardenable pressure sensitive adhesion agent layer a having a thickness of 20 μm was laminated at 60° C. using a laminator to obtain a gas barrier laminate. Next, the release film on the hardenable pressure sensitive adhesion agent layer side was peeled off, and the laminate was bonded to the electric wiring formation surface of the electric-wiring-attached silicon wafer at 60° C. using a laminator, and the gas barrier laminate protruding around the periphery of the silicon wafer was cut off. Then, the above-described thermal curing treatment was performed. Thereafter, singulation by dicing was performed by the above-described procedure to obtain singulated chips.

Example 2

Singulated chips were obtained in the same manner as in Example 1 except that the hardenable pressure sensitive adhesion agent layer a having a thickness of 10 μm was used.

Example 3

Singulated chips were obtained in the same manner as in Example 1 except that the hardenable pressure sensitive adhesion agent layer a having a thickness of 5 μm was used.

Example 4

Singulated chips were obtained in the same manner as in Example 1 except that the hardenable pressure sensitive adhesion agent layer b having a thickness of 10 μm was used.

Example 5

Singulated chips were obtained in the same manner as in Example 1 except that the hardenable pressure sensitive adhesion agent layer c having a thickness of 10 μm was used.

Example 6

Singulated chips were obtained in the same manner as in Example 2 except that the gas barrier film B was used.

Example 7

Singulated chips were obtained in the same manner as in Example 2 except that the gas barrier film C was used.

Comparative Example 1

Singulated chips were obtained in the same manner as in Example 1 except that the hardenable pressure sensitive adhesion agent layer d having a thickness of 10 μm was used and that the thermal curing treatment conditions were changed to the above-described conditions.

Comparative Example 2

Singulated chips were obtained in the same manner as in Example 1 except that the hardenable pressure sensitive adhesion agent layer d having a thickness of 10 μm was used and that the thermal curing treatment was not performed.

[Table 2]

TABLE 2

| | Gas barrier film | Type of hardenable pressure sensitive adhesion agent layer | Storage modulus E0 at 23° C. before curing [MPa] | Post-curing storage modulus E1 at 23° C. [MPa] | Thickness [μm] | Light transmittance (%) | End portion deformation ratio [%] | Electrical resistance change ratio [%] |
|---|---|---|---|---|---|---|---|---|
| Example 1 | A | a | 0.46 | 5400 | 20 | G | 0.3 | 2.1 |
| Example 2 | A | a | 0.46 | 5400 | 10 | G | 0.1 | 1.5 |
| Example 3 | A | a | 0.46 | 5400 | 5 | G | 0.1 | 1.2 |
| Example 4 | A | b | 0.44 | 2350 | 10 | G | 0.8 | 3.9 |
| Example 5 | A | c | 0.47 | 1120 | 10 | G | 15.2 | 10.8 |
| Example 6 | B | a | 0.46 | 5400 | 10 | G | 0.1 | 2.8 |
| Example 7 | C | a | 0.46 | 5400 | 10 | G | 0.1 | 0.4 |
| Comparative Example 1 | A | d | 0.81 | 620 | 10 | G | 69.2 | >1000 |
| Comparative Example 2 | A | d* | 2.00 | 2 | 10 | G | 89.1 | >1000 |

*Note:
In Comparative Example 2, the hardenable pressure sensitive adhesion agent layer was used in an uncured state.

From the results shown in Table 2, it can be seen that the gas barrier laminates of Examples 1 to 7 having a hardenable pressure sensitive adhesion agent layer having a post-curing storage modulus E1 at 23° C. of 1.0 GPa (1,000 MPa) or more have good light transmittance, and that the end portion deformation ratio of the hardenable pressure sensitive adhesion agent layer is significantly small and the change in electrical resistivity of the obtained singulated chips is significantly small, as compared with the gas barrier laminates of Comparative Examples 1 and 2 in which the storage modulus of the hardenable pressure sensitive adhesion agent layer is less than 1.0 GPa.

In addition, it can be understood that, in the gas barrier laminates of Comparative Examples 1 and 2 having the hardenable pressure sensitive adhesion agent layer having a post-curing storage modulus E1 at 23° C. of less than 1.0 GPa (1,000 MPa), the end portion deformation ratio of the hardenable pressure sensitive adhesion agent layer is significantly large, the change in electrical resistivity of the obtained singulated chips is extremely large, and the gas barrier layers in the singulated chips are ruptured or the like, as compared with those in the gas barrier laminates of Examples 1 to 7.

INDUSTRIAL APPLICABILITY

The gas barrier laminate of the present invention can provide a singulated product in which the gas barrier layer is not ruptured when the gas barrier laminate is laminated on an adherend and singulated together with the adherend. Therefore, the gas barrier laminate can be widely applied to electronic devices such as optical sensors in which electric wiring is formed on a silicon wafer. In particular, the gas barrier laminate can be suitably applied to an electronic device used in a moist heat environment.

The present application is based on Japanese Patent Application No. 2022-053952 filed on Mar. 29, 2022, the entire contents of which are incorporated herein by reference.

REFERENCE SIGNS LIST

10: Base material
20: Gas barrier layer
30: Hardenable pressure sensitive adhesion agent layer
30a: Cured hardenable pressure sensitive adhesion agent layer
40: Electric wiring
41: Wiring
42: Electrode
60a to 60d: Side surface sealing layer
70: Terminal
80: Dicer
100: Gas barrier laminate
150: Adherend
200: Semiconductor wafer
201: Electric-wiring-attached wafer
202: Gas-barrier-laminate-attached wafer
203: Gas-barrier-laminate-attached wafer after electrode exposure
300: Singulated chip before sealing
301: Singulated chip after side surface sealing
D: Breakage portion of gas barrier layer
N: Notch

The invention claimed is:

1. A gas barrier laminate comprising:
a base material film, a gas barrier layer, and a hardenable pressure sensitive adhesion agent layer in this order, wherein
the hardenable pressure sensitive adhesion agent layer has a post-curing storage modulus E1 at 23° C. of 2.0 GPa to 10.0 GPa, and
the hardenable pressure sensitive adhesion agent layer has a storage modulus E0 at 23° C. of from 0.01 to 10 MPa.

2. The gas barrier laminate according to claim 1, wherein the hardenable pressure sensitive adhesion agent layer has a storage modulus E0 at 23° C. of from 0.1 to 5 MPa.

3. The gas barrier laminate according to claim 1, wherein the hardenable pressure sensitive adhesion agent layer has a thickness of 1 μm or more.

4. The gas barrier laminate according to claim 1, wherein the gas barrier layer has a water vapor transmission rate of $1.0 \times 10^{-2}$ g/m²/day or less in an atmosphere of 40° C. and 90% relative humidity.

5. The gas barrier laminate according to claim 1, wherein the gas barrier layer comprises a modified layer formed by ion implantation and/or a chemical vapor deposition layer.

6. The gas barrier laminate according to claim 1, wherein the gas barrier laminate has a light transmittance of 85% or more at at least any of wavelengths in a range of from 380 to 780 nm.

7. A method for producing a sealed body, comprising:
attaching a hardenable pressure sensitive adhesion agent layer of the gas barrier laminate of claim 1 to a surface of a workpiece to seal the surface of the workpiece; and
cutting the workpiece whose surface is sealed by the gas barrier laminate to obtain a singulated sealed body.

8. The gas barrier laminate according to claim 2, wherein the hardenable pressure sensitive adhesion agent layer has a thickness of 1 μm or more.

9. The gas barrier laminate according to claim 2, wherein the gas barrier layer has a water vapor transmission rate of $1.0 \times 10^{-2}$ g/m²/day or less in an atmosphere of 40° C. and 90% relative humidity.

10. The gas barrier laminate according to claim 2, wherein the gas barrier layer comprises a modified layer formed by ion implantation and/or a chemical vapor deposition layer.

11. The gas barrier laminate according to claim 2, wherein the gas barrier laminate has a light transmittance of 85% or more at at least any of wavelengths in a range of from 380 to 780 nm.

* * * * *